United States Patent
Deep et al.

(10) Patent No.: US 12,488,559 B2
(45) Date of Patent: Dec. 2, 2025

(54) DISTRIBUTED SYSTEM FOR EFFICIENT ENTITY RECOGNITION

(71) Applicant: Amazon Technologies, Inc., Seattle, WA (US)

(72) Inventors: Aakash Deep, Redmond, WA (US); Jia Bi Zhang, Kirkland, WA (US); Jonathan Hedley, Mittagong (AU)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/732,243

(22) Filed: Jun. 3, 2024

(65) Prior Publication Data
US 2024/0320951 A1    Sep. 26, 2024

Related U.S. Application Data

(63) Continuation of application No. 17/219,715, filed on Mar. 31, 2021, now Pat. No. 12,039,770.

(51) Int. Cl.
*G06V 10/75* (2022.01)
*G06F 18/22* (2023.01)
*H04L 67/10* (2022.01)

(52) U.S. Cl.
CPC ............ *G06V 10/75* (2022.01); *G06F 18/22* (2023.01); *H04L 67/10* (2013.01)

(58) Field of Classification Search
CPC ........ G06V 10/75; G06V 10/95; G06V 20/52; G06F 18/22; H04L 67/10
See application file for complete search history.

(56) References Cited

U.S. PATENT DOCUMENTS

| 10,176,200 B2 * | 1/2019 | Lavi ..................... G06F 16/56 |
| 10,616,338 B1 * | 4/2020 | Gupta ................. H04L 67/1097 |
| 11,075,991 B2 | 7/2021 | Gupta et al. |
| 11,436,906 B1 * | 9/2022 | Peddinti .................. G08B 5/36 |

(Continued)

FOREIGN PATENT DOCUMENTS

CN    111046788 A   *   4/2020

OTHER PUBLICATIONS

Yu A. Malkov, et al., "Efficient and robust approximate nearest neighbor search using Hierarchical Navigable Small World graphs", Retrieved from https://arxiv.org/pdf/1603.09320.pdf, IEEE Tansactions on pattern analysis and machine intelligence 42.4, 2018, pp. 824-836.

(Continued)

*Primary Examiner* — Brandon J Miller
(74) *Attorney, Agent, or Firm* — Robert C. Kowert; Kowert, Hood, Munyon, Rankin & Goetzel, P.C.

(57) ABSTRACT

A first encoding representing a set of detected signals is obtained at a sensor-proximity resource of an object recognition application which also includes resources of an analytics service of a provider network. In response to a determination that a cache at the sensor-proximity resource does not include a second encoding which satisfies a similarity criterion with respect to the first encoding, at least a portion of a partition of a spatial index is obtained from another resource selected using an index partition map. A recognition-based action is initiated based on determining that the partition includes an encoding which satisfies the similarity criterion.

20 Claims, 12 Drawing Sheets

(56) References Cited

U.S. PATENT DOCUMENTS

| | | | |
|---|---|---|---|
| 2015/0077568 A1* | 3/2015 | Tsunematsu | G08B 13/19645 |
| | | | 348/159 |
| 2018/0114101 A1* | 4/2018 | Desai | G06N 20/00 |
| 2020/0226416 A1* | 7/2020 | Bapat | G08B 13/19645 |
| 2020/0236171 A1 | 7/2020 | Gupta et al. | |
| 2021/0279475 A1* | 9/2021 | Tusch | H04L 63/0861 |
| 2021/0344991 A1* | 11/2021 | Todd | H04N 21/4438 |

OTHER PUBLICATIONS

Herve Jegou, et al., "Faiss: A library for efficient similarity search", Retrieved from https://engineering.fb.com/2017/03/29/data-infrastructure/faiss-a-library-for-efficient-similarity-search/ on Mar. 8, 2021, pp. 1-9.

Erik Bernhardsson, "Benchmarking nearest neighbors", Retrieve from https://github.com/erikbern/ann-benchmarks/ on Mar. 8, 2021, pp. 1-12.

Wikipedia, "k-d tree", Retrieved from https://en.wikipedia.org/wiki/K-d_tree on Jan. 26, 2021, pp. 1-11.

Javen Qinfeng Shi, "Introduction to Cover Tree", Oct. 15, 2006, Retrieved from http://users.cecs.anu.edu.au/~qshi/talk/introduction%20to%20covertree060815.pdf, pp. 1-53.

Masatoshi Hanai, et al., "Distributed Edge Partitioning for Trillion-edge Graphs", arXiv:1908.05855v2, Sep. 21, 2019, pp. 1-14.

Alina Beygelzimer, et al., "Cover Trees for Nearest Neighbor", Retrieved from https://www.cc.gatech.edu/~isbell/reading/papers/cover-tree-icml.pdf, pp. 1-8.

\* cited by examiner

Partitioning Approach 751

Partitioning Approach 752

Partitioning Approach 753

DISTRIBUTED SYSTEM FOR EFFICIENT ENTITY RECOGNITION

PRIORITY APPLICATION

This application is a continuation of U.S. patent application Ser. No. 17/219,715, filed Mar. 31, 2021, which is hereby incorporated by reference herein in its entirety.

BACKGROUND

Object recognition techniques have traditionally been implemented using powerful servers located in corporate data centers or within cloud computing environments. For example, sophisticated machine learning models for image and video analysis may be trained and run on servers equipped with graphics processing units (GPUs) and/or other special-purpose chips designed specifically for machine learning computations, enabling models of very high complexity to be used behind the scenes for a variety of object recognition-based applications.

Some types of applications may have stringent latency requirements for recognizing objects and/or faces within captured images or video. For example, employees that are recognized based on comparing their images with a database of images of authorized employees may be allowed to enter office buildings without having to swipe badges or provide other forms of identification. If the time taken to recognize the employees in such a scenario is too long, however (e.g., if substantial network latency is incurred during the image processing workflow), the recognition based approach may not work well. Similar performance constraints may apply in other problem domains as well, e.g., in automated cashier-less retail stores at which the products customers choose to buy may be recognized without the customers having to wait in checkout lines.

Frequent transfers of video, images and/or other data or metadata needed for object recognition over the public Internet, e.g., between cameras positioned at locations frequented by end users of the object recognition-based applications and distant data centers, may potentially raise concerns regarding data privacy and security in some scenarios. Designing automated object recognition systems that can satisfy stringent performance requirements and also reduce such potentially problematic data transfers remains a challenging technical problem.

Figure 1:
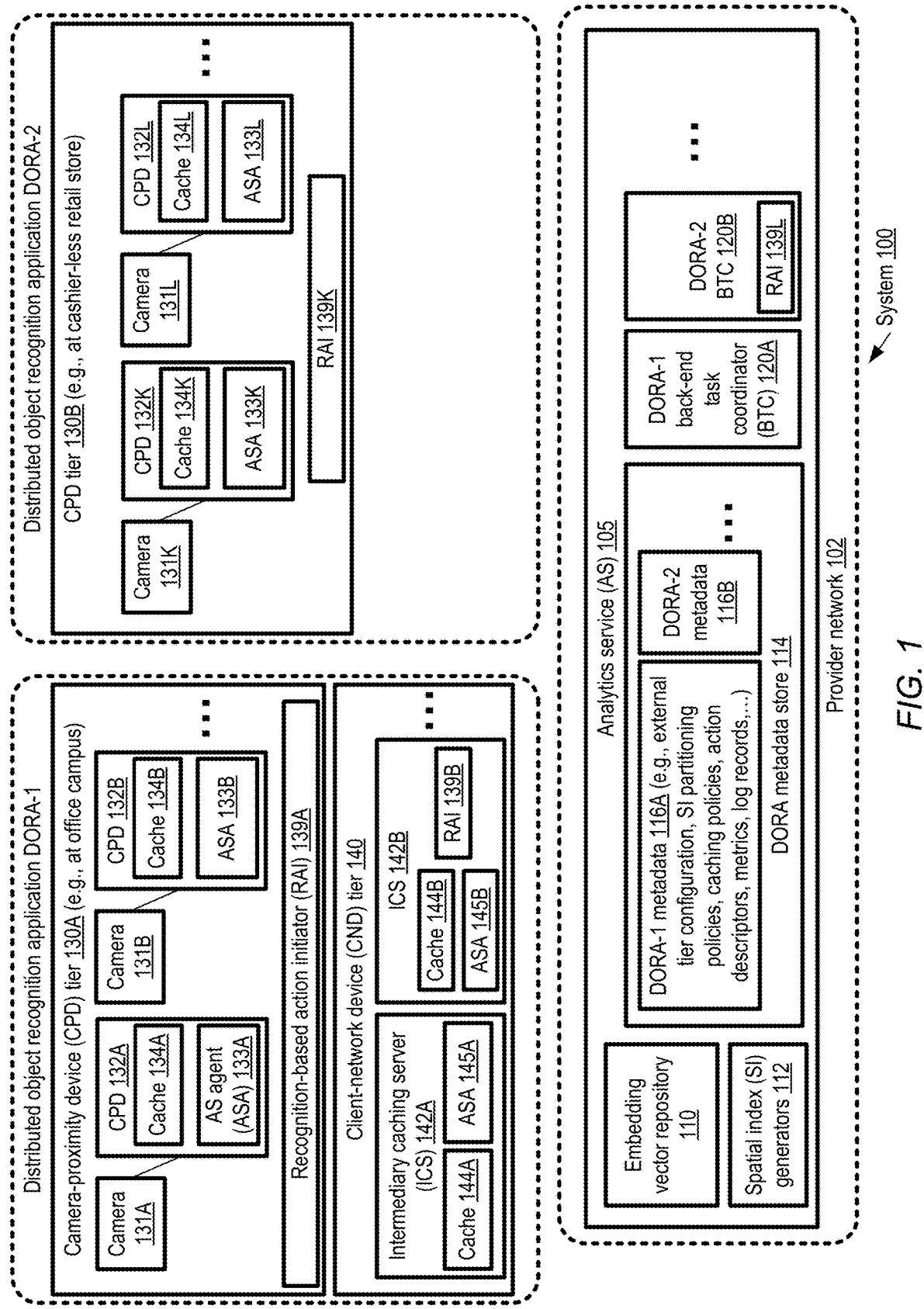
FIG. 1 illustrates an example system environment in which a multi-tier distributed object recognition applications may be implemented, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

The present disclosure relates to methods and apparatus for implementing multi-tier distributed object recognition applications which enable efficient recognition of entities, typically using computing resources located close to the locations at which images of the entities are captured to perform as many of the required computations as feasible. The images from which entities (e.g., faces or inanimate objects) are to be recognized or identified may be captured by a set of cameras or other sensors positioned at various locations, and one of the tiers of a distributed object recognition application (DORA) may comprise a set of computing devices in close proximity to, and at least in some cases linked via low-latency network connections to, the cameras or sensors. Such devices may be referred to as camera-proximity resources or sensor-proximity resources. The computing, memory and storage capabilities of the sensor-proximity resources may vary at different DORAs; in some cases, the sensor-proximity resources may be low-power-consumption, small-footprint devices with relatively simple processors and a small amount of memory. An analytics service implemented at a provider network or cloud computing environment may orchestrate the operations of the distributed object recognition operations on behalf of various clients, and resources set aside for a given DORA at the provider network may constitute a back-end tier of the DORA. DORAs may also be referred to as distributed entity recognition applications or DERAs.

In some cases, a DORA may comprise an intermediary tier between the sensor-proximity tier and the back-end tier—e.g., a set of servers located at a premise of the client of the analytics service on whose behalf a DORA is configured may also participate in some aspects of the object recognition workflow. Information about the set of devices external to the provider network, such as sensor-proximity tier devices and/or intermediary-tier devices, to be used for a client's DORA may be provided via programmatic interfaces to the analytics service by the client, and the analytics service may utilize the provided information to coordinate the operations at each of the tiers. In at least some cases, depending on whether objects/entities are recognized or not, various types of actions may be initiated, e.g., by other devices at locations close to the sensors (such as electronic devices that inlock or open doors of an office building if a person wishing to enter is recognized), so providing the results of object recognition techniques as quickly as possible to the action initiation devices may be important.

At a high level, a DORA may be operated, e.g., in accordance with preferences and policies indicated by the analytics service client, to perform as many object recognition related tasks as possible at devices closer to the sensors/cameras, thus enhancing performance as well as data security compared to approaches in which most or all of the tasks are performed at resources. For example, in various embodiments, the sensor-proximity computing resources (SPRs) may each comprise a cache within which representations of respective subsets or partitions of a spatial index created for a database of images (with individual images depicting one or more known entities/objects) are stored. The terms "entity" and "object" may be used interchangeably herein to refer to inanimate items (e.g., items of a retail store inventory, portions of documents, etc.) as well as portions or all of animate or living creatures (e.g., human faces, pets, livestock etc.) which can be recognized using automated image processing techniques. A spatial index may comprise a data structure which enables efficient similarity-based searches of representations, such as respective embedding vectors, of objects within images of the database. Such embedding vectors may be referred to as object encodings, object vectors, image encodings, or image vectors in at least some embodiments. Note that unlike conventional searches, in which the decision as to whether a searched-for item is present in a database or not is exact or clear cut (either the searched-for item is present, or it is not), object recognition searches may be more probabilistic in nature, since a vector generated from a newly captured image of a given entity is typically very unlikely to exactly match a previously-generated vector of another image of the same entity. In effect, a result of a similarity-based search may often include a confidence level metric indicating less than a 100% certainty of a recognition, such as "there is a 90% probability that the object in new image I1 is the same object depicted in earlier-captured image I2 of the database". It is noted that while vectors are mentioned as the primary examples of data structures used to represent respective images or objects to be recognized in much of this document, the techniques described herein may be employed with equal success in embodiments in which other types of data structures (such as matrices) are used instead. In some embodiments, instead of or in addition to conventional images, other types of sensor-collected data (e.g., thermal sensor data, light detection and ranging (LIDAR) data or the like) may be stored in a database, and similarity based searches of such data may be conducted using the kinds of distributed techniques described herein.

When a vector representation NV (for "new vector") of a newly-captured image (i.e., an image from which one or more of the known objects are to be recognized if possible) is obtained or generated at an SPR, a search may first be conducted in the local cache to determine whether some pre-cached object vector PV (for "pre-cached vector") is sufficiently similar to NV that a known object can be said to have been recognized in the newly-captured image. If an object is recognized (with a probability or confidence level higher than some selected threshold) within the cache, a recognition-based action may be initiated, e.g., by sending one or more messages or signals to an application-dependent action initiator in various embodiments. For example, a recognition-based action may comprise unlocking an office door after an employee is recognized, adding a recognized item to a checkout list of a cashier-less retail store, and so on.

If the local cache does not contain a sufficiently-similar vector, a partition map created for the spatial index may be consulted (e.g., either locally at the SPR, or at a nearby device referred to as a request router) to identify one or more other target resources of the DORA which may have relevant partitions of the spatial index in various embodiments. To the extent possible, based on the configuration of the different tiers of the DORA, such target resources may preferably be selected from among the nearby resources of the DORA, e.g., within the sensor-proximity tier, so as to incur shorter delays in obtaining the partitions than if resources further away had to be utilized. A partition may be deemed to be relevant to NV if it is likely to contain vectors in the spatial or geometrical neighborhood or vicinity of NV. In at least some embodiments, the spatial index may be partitioned in such a way that if a vector is part of a partition $P_i$, it is on average likely to be more similar (closer in Euclidean distance within the multidimensional space corresponding to the dimensions of the vectors used, or in the same vector "neighborhood") to other vectors within $P_i$ than to vectors in a different partition $P_j$. Queries or requests may be sent to the target resources, and the relevant partition or partitions may be obtained from the target resources and stored at least temporarily in the local cache of the SPR in some embodiments. If a newly-obtained partition does contain a sufficiently similar vector, a recognition-based action may be initiated in various embodiments. If none of the newly-obtained partitions comprise a sufficiently-similar vector, an action associated with non-recognition may be initiated in at least some embodiments. The newly-received partition(s) may be retained in the local cache in accordance with a cache retention policy used for the DORA in various embodiments. For at least some DORA use cases, it may be the case that the same object may have to be recognized several times within a relatively short space of time, so it may be more efficient to retain the relevant partitions locally for some time.

As one skilled in the art will appreciate in light of this disclosure, certain embodiments may be capable of achieving various advantages, including some or all of the following: (a) reducing the average time taken between the capture of an image and the recognition or non-recognition of objects or entities represented in the image, thus enabling response actions to be initiated rapidly regardless of whether objects were recognized or not, (b) reducing the overall amount of networking bandwidth that has to be utilized for object recognition applications, e.g., relative to scenarios in which the computations are performed primarily at provider networks or corporate data centers, and/or (c) enhancing data security for object recognition applications by reducing the number of times potentially sensitive data is transferred over the public Internet or other types of less secure network pathways.

According to some embodiments, a system may comprise one or more computing devices. The computing devices may include instructions that upon execution on or across the one or more computing devices cause the one or more computing devices to provide an indication, via one or more programmatic interfaces, that connectivity has been established between at least some devices at different tiers of a DORA on behalf of a client of a provider network or cloud computing environment. The DORA may include, for example, (a) a camera-proximity tier comprising a plurality of camera-proximity devices including a first camera-proximity device (CPD) associated with a first camera, (b) an intermediary tier comprising at least a first device within a network external to the provider network, and (c) a back-end tier comprising one or more resources at an analytics service implemented at one or more data centers of the provider network. CPDs may represent one example of the sensor-proximity resources (SPRs) discussed above.

In various embodiments, a first embedding vector representing at least a portion of a first image captured by the first camera may be obtained at the first CPD. In some implementations, the CPD may execute a trained machine learning model locally to obtain the first embedding vector; in other embodiments, the first embedding vector may be generated at a different device (e.g., a device at the intermediary tier or at the analytics service) to which the captured first image is sent for processing.

A cache maintained at the first CPD may be examined to determine whether some other embedding vector in the cache satisfies a similarity criterion with respect to the first embedding vector. Any of a variety of search techniques may be employed in different embodiments, depending on the data structures used to represent the collection of embedding vectors from which entities are to be recognized for the DORA—e.g., a tree traversal or graph traversal may be used, in which the vector-space distance between the new embedding and the embeddings of the tree/graph is used to select the next step of the traversal. The threshold similarity criterion may be a tunable parameter, with its value selected by the analytics service and/or based on programmatic input received from the analytics service client on whose behalf the DORA is established in some embodiments. If the local cache contains a sufficiently similar embedding vector, one or more recognition-based actions may be initiated in various embodiments.

In response to a determination that the first CPD's cache currently does not contain a sufficiently similar vector, a cache miss workflow may be initiated in various embodiments. Using an index partition map, a set of one or more query targets to which index partition requests pertaining to the first embedding vector are to be directed may be identified in at least some embodiments. The set of one or more query targets may comprise, for example, at least another device of the camera-proximity tier, at which a particular partition of a spatial index generated for the first distributed object recognition application is stored. Any of a variety of algorithms and/or data structures (including various types of tree-based or graph-based data structures such as cover trees, K-dimensional (K-D) trees or HNSW (hierarchical navigable small world) graphs) may be employed for the spatial index in different embodiments. The particular partition may comprise one or more other embedding vectors which belong to the spatial neighborhood or vicinity of the first embedding vector in at least some embodiments. The particular partition may be identified based on a similarity-based search of the index partition map in some embodiments. As such, the index partition map may be used in various embodiments to eliminate, from a potentially large number of partitions of the spatial index, one or more irrelevant partitions (i.e., partitions which are unlikely to include embedding vectors which satisfy the similarity threshold), thus reducing the size of the subset of the spatial index which has to be searched to find a potential match for the first embedding vector.

A query or partition request may be sent to one or more of the query targets, and at least a portion of a particular partition of the spatial index may be obtained at the CPD in various embodiments. A determination may be made at the CPD as to whether the retrieved partition (or portion of a partition) includes an embedding vector which satisfies the similarity criterion with respect to the first embedding vector. If such a matching embedding vector is found, a recognition-based action may be initiated in various embodiments, with the particular type of action being selected based at least in part on metadata pertaining to the matching embedding vector. For example, in one application, if the matching embedding vector's metadata indicates that an individual represented by the matching embedding vector is authorized to enter a particular building at whose entrance the camera linked to the CPD is installed, the individual may be permitted to enter the building. If no match is found in the retrieved partition, a different type of action referred to as a non-recognition action may be initiated in various embodiments—e.g., the individual whose image was captured using the first camera in the above example may be notified that the individual needs to provide additional identification information to some other sensor or a security official to determine whether the individual is permitted to enter the building.

In some embodiments, when a cache miss occurs at a given CPD, an attempt may first be made to determine (e.g., using the index partition map) whether a copy of a relevant partition is available at the CPD tier. If such a copy is not found at the CPD tier, and the DORA includes an intermediary tier, a device at an intermediary tier (which may also be identified using the index partition map) may be requested to send a copy of the relevant partition. If the intermediary tier device also does not have a copy, a request may be sent (either from the intermediary tier, or from the CPD at which the cache miss occurred) to a back-end provider network resource for the relevant partition.

In at least some embodiments, the client on whose behalf the DORA is operated or configured may provide various types of information to be used to configure the DORA appropriately to the analytics service via programmatic interfaces such as web-based consoles, graphical user interfaces, command-line tools, application programming interfaces and the like. In various embodiments, a list or descriptor of the various camera-proximity devices or other sensor-proximity resources to be included in the DORA, as well as any intermediary devices located at client networks or client premises (which may also be referred to as edge computing devices or edge resources), may be provided to the analytics service. Back-end task coordinators, implemented at one or more computing devices used for the analytics service and located at provider network data centers, may verify network connectivity between at least a subset of the sensor-proximity resources and one or more other resources of the DORA prior to initiating object recognition operations in various embodiments. In at least one embodiment, one or more messages confirming that such connectivity has been established may be sent to the client from the analytics service, e.g., at the request of the client or proactively as part of the DORA setup procedure.

In one embodiment, a client may provide the analytics service a collection of images and/or videos of entities which are to be recognized using the DORA. A spatial index (and an associated index partition map for partitions of the spatial index) may be constructed from the collection of images/videos by the analytics service, e.g., using one or more resources at the provider network data centers and/or resources of one or more DORA tiers external to the provider network data centers. In other embodiments, instead of providing the images, embedding vectors corresponding to the images may be provided by the clients to the analytics service. If a client provides videos, the analytics service may first generate still images from the videos, and then construct the spatial index.

In some embodiments programmatic interfaces of the analytics service may be used by a client to indicate a desired target accuracy level or confidence level (or an acceptable range of such levels) for recognizing entities using the DORA (e.g., the logical equivalent of "I would like no less than 95% confidence for recognitions"). In one embodiment, clients may also or instead indicate performance requirements for their object recognition tasks—e.g., that a yes ("entity recognized as Entity1") or no ("Entity not recognized") answer is to be provided with an average or maximum latency of N milliseconds after the corresponding image is captured. A particular algorithm for constructing and partitioning the spatial index for the client may be selected based at least in part on the targeted accuracy/confidence levels or ranges, and/or based at least in part on targeted performance requirements in some embodiments. Some spatial index partition search algorithms may, for example, be faster than others but may not be as accurate (or produce results with confidence levels as high) as the others. Tradeoffs between speed and accuracy of object/entity recognition may thus be made based on the client's preferences in at least some embodiments.

If desired, clients may indicate caching policies to be used on their behalf (e.g., how long a partition is to be retained in a cache even if no matching vector is found in the partition, cache eviction candidate selection policies, etc.) in some embodiments. In one embodiment, replication policies for spatial index contents may be indicated by clients—e.g., how many different devices at each tier of the DORA are to keep copies of a given partition, so that failures at individual devices can be handled, and so that cache misses can be handled quickly. In accordance with such replication policies, copies of various partitions may be propagated to respective replication destinations in at least some embodiments.

In at least some embodiments, various parameters governing the operations of a DORA may be dynamically adjusted by the analytics service. For example, an initial similarity threshold or minimum confidence level for entity recognition may be selected based on heuristics by the analytics service and/or based on client preferences. Later, based for example of feedback from the client and/or end users of the DORA, the similarity criteria used for determining whether an entity has been recognized may be modified, e.g., by raising or lowering the threshold. In another example, the dimensionality of the vectors used to represent embeddings or encodings of the to-be-recognized entities may be modified over time, e.g., to increase the accuracy of the recognition operations.

In one embodiment, the provider network or back-end tier of a DORA may be considered the primary and authoritative repository of the embedding vectors being used for object recognition for the DORA. As and when a partition or portion of a partition is to be obtained at another tier, and cannot be found at any of the other tiers, it may be requested from the back-end tier. In at least some implementations, it may be the case that not all the embedding vectors of the spatial index are distributed among the devices of a given tier.

For example, consider a simple scenario in which the amount of memory or storage space needed to store the entire set of embedding vectors is 10 gigabytes, but the total amount of space available at the collection of devices of the CPD tier, taken together, is 8 gigabytes. In such a scenario, the contents of the partitions propagated to the CPD tier may add up to a total of no more than 8 gigabytes, with the remaining 2 gigabytes available at the back-end provider network tier. In such scenarios, even if all the partitions available at the CPD tier were to be searched for similar vectors with respect to a newly-generated embedding vector, it may be the case that the most similar embedding vector (which would potentially result in a recognition-based action) happens to remain at the provider network tier. In some embodiments, clients of the analytics service may provide thresholds or conditions to be used to determine, in a case where a sufficiently similar vector cannot be found at a particular tier even after the relevant partitions available at that tier have been searched, whether a query is to be sent to another tier such as the provider network tier (or an intermediary tier).

According to at least some embodiments, as discussed above, the analytics service used for at least some aspects of distributed object recognition may be implemented at a provider network. The term "provider network" (sometimes simply called a "cloud") refers to a large pool of network-accessible computing resources (such as compute, storage, and networking resources, applications, and services), which may be virtualized or bare-metal. The cloud can provide convenient, on-demand network access to a shared pool of configurable computing resources (e.g., including resources at which software containers used for running instrumented machine learning models are executed) that can be programmatically provisioned and released in response to customer commands. These resources can be dynamically provisioned and reconfigured to adjust to variable load. The resources of a provider network may in some cases be distributed across multiple data centers, which in turn may be distributed among numerous geographical regions (e.g., with each region corresponding to one or more cities, states or countries). For example, a cloud provider network can be formed as a number of regions, where a region is a geographical area in which the cloud provider clusters data centers. Each region can include two or more availability zones connected to one another via a private high speed network, for example a fiber communication connection. An availability zone refers to an isolated failure domain including one or more data center facilities with separate power, separate networking, and separate cooling from those in another availability zone. Preferably, availability zones within a region are positioned far enough away from one other that the same natural disaster should not take more than one availability zone offline at the same time. Customers can connect to availability zones of the cloud provider network via a publicly accessible network (e.g., the Internet or a cellular communication network). A provider network may include numerous network-accessible services, such as a virtualized computing service (VCS), one or more storage services, database services and the like, as well as the analytics service (which may also be referred to as a machine learning service, or implemented as a component of a more general machine learning service). A VCS may also be referred to as an elastic compute service, virtual machines service, computing cloud service, compute engine, and/or cloud compute in various implementations.

Example System Environment

FIG. 1 illustrates an example system environment in which a multi-tier distributed object recognition applications may be implemented, according to at least some embodiments. As shown, system 100 may comprise resources and artifacts of an analytics service (AS) 105 implemented at least in part at a provider network 102. A variety of multi-tier distributed object recognition applications (DORAs), such as DORA-1 and DORA-2, which comprise at least some resource external to the data centers of provider network 102, may be implemented with the help of the AS 105 in the depicted embodiment. DORA-1, instantiated on behalf of a client of the AS, may comprise a camera-proximity device (CPD) tier 130A (e.g., located at an office campus comprising one or more buildings), an intermediary client-network device (CND) tier 140 (e.g., within a data center at one of the buildings of the office campus), as well as a back-end task coordinator (BTC) 120A comprising one or more provider network resources (e.g., processes or threads of one or more programs) in the depicted embodiment. The CPD tier and the CND tier may be referred to as external tiers in some embodiments, as they comprise resources external to the data centers of the provider network 102. DORA-2, which may be established on behalf of a different client of the AS, may comprise a CPD tier 130B (e.g., located at a cashier-less retail store) and a BTC 120B, but may not include a CND tier in the example scenario shown in FIG. 1. Thus, not all the DORAs implemented with the help of the AS may have the same number of tiers in at least some embodiments. In one embodiment, a DORA may comprise a CND tier (to which signals captured at cameras or other sensors are transferred) and a BTC tier, but may not necessarily include CPDs.

The AS 105 may include an embedding vector repository 110 in the depicted embodiment, in which respective collections of embedding vectors (or other data structures used for encoding learned features of entities captured in images or videos) for various DORAs may be stored. Using the collection of embedding vectors for a given client's DORA, one or more spatial index (SI) generators 112 may produce one or more spatial indices for the client. A spatial index may comprise one or more data structures (e.g., a tree-based data structure or a graph-based data structure) which can be used to respond to spatial queries, such that searches for embedding vectors that meet a similarity criterion with respect to an input embedding vector may be conducted efficiently. The spatial index constructed for a given DORA may be subdivided or partitioned, and respective partitions may be cached at individual ones of the devices at the different tiers of the DORA in the depicted embodiment. As a result of such distributed caching, object recognition attempts may be made more quickly with respect to the time at which images are captured at the CPD layer than if most of the work for entity recognition were to be performed at the provider network 102. In addition, the overall rate at which images, videos or other potentially sensitive data are transmitted between the external tiers and the provider network may be reduced relative to implementations in which most of the work for entity recognition is performed at the provider network 102. In some embodiments, a spatial index for a DORA may be generated at least partly at the external tiers of a DORA.

Metadata store 114 of AS 105 may be used to store respective sets of metadata for each of the DORAs established on behalf of AS clients in the depicted embodiment. DORA-specific metadata 116, such as 116A or 116B may, for example, include details of the external tier configuration of the DORA (e.g., the number of devices at each tier external to the provider network, their network addresses and desired reachability from one another, their physical locations relative to one another, their respective resource capacities such as CPU and memory specifications, etc.). In some embodiments, the metadata for a given DORA may include client-specified or AS-selected spatial index partitioning policies, caching policies, descriptors of actions to be initiated in response to recognition or non-recognition of entities in captured images or video, and the like. Metrics from the various tiers of the DORA, as well as log records generated at the different tiers, may also be included in the DORA-specific metadata such as DORA-1 metadata 116A and DORA-2 metadata 116B in various embodiments. The BTCs 120, such as BTC 120A configured for DORA-1, and BTC 120B configured for DORA-2, may orchestrate the initial setup of the other tiers of the DORAs (e.g., establishing and/or verifying network connectivity between the different tiers and/or within individual tiers, ensuring that the appropriate software for object recognition has been deployed at the devices of the different tiers etc.) in at least some embodiments. The BTCs 120 may also propagate at least some policies (e.g., the caching policies to be implemented for caches at the devices of the external tiers) and data structures (e.g., SI partitions) needed for object recognition to resources at the external tiers, e.g., either on demand or proactively as part of the initial configuration of the external tiers in some embodiments.

A CPD tier 130 may comprise one or more CPDs, which may be linked via physical or wireless network links to respective cameras in the depicted embodiment. Other types of sensors in addition to or instead of cameras, such as motion sensors, weight sensors, infra-red devices such as thermal imagers, scanners, light detection and ranging (LIDAR) devices and the like may be used in some embodiments to detect signals of the potential presence of entities which are to be recognized. CPD tier 130A of DORA-1 includes CPDs 132A and 132B in the depicted scenario, while CPD tier 130B of DORA-2 comprises CPDs 132K and CPD 132L. Each of the CPDs 132 is linked to a respective camera 131, and comprises an AS (analytics service) agent 133 (e.g., one or more threads or processes) and has a respective cache 134 for storing spatial index contents (e.g., at least a portion of a partition of the spatial index). CPD 132A of DORA-1 is linked to camera 131A and comprises AS agent 133A and cache 134A, while CPD 132B is linked to camera 131B and comprises AS agent 133B and cache 134B. In DORA-2, CPD 132K is linked to camera 131K and comprises AS agent 133K and cache 134K, while CPD 132L is linked to camera 131L and comprises AS agent 133L and cache 134L. Note that not all the CPDs of a given DORA may necessarily have the identical computing capacity or be attached to the same type of sensors—e.g., camera 131A may differ from camera 131B in the resolution of the video or images it can capture, cache 134A may differ in size (or may use a different memory or storage device technology) from cache 134B, and so on. A given AS agent 133 may be configured to communicate with at least one other resource of the DORA of which it is a part in the depicted embodiment. In one implementation, a given AS agent such as 133A may be connected via a network to ASA 133B of CPD 132B, ASAs 145A and 145B of CND tier 140, and also to BTC 120A at the provider network 102. In another implementation in which a CND tier is configured, AS agents at the CPD tier may communicate with each other and with at least one ASA at a CND tier, but may not necessarily be connected directly with the BTC; instead, communications between the CPD tier and the BTC may be conducted using the CND tier as an intermediary.

In the depicted example scenario, CND tier 140 may comprise intermediary caching server (ICS) 142A with cache 144A and ASA 145A, and ICS 142B comprising cache 144A and ASA 145B. In at least some implementations, the ICSs may have greater computing, memory, storage, and/or networking capacities than CPDs. Caches 144 at the CND tier servers may for example be larger than the caches at the CPDs, while ASAs 145 at the CND tiers may provide more functionality than ASAs 133 at the CPDs. The caches 134 and 144 may be implemented using any of a variety of storage or memory device technologies in different embodiments. For example, in one embodiment, at least some of the caches 144 at the CND tier of a DORA may comprise solid state drives and/or a particular type of main memory, while caches 134 at the CPD tier may comprise a different type of main memory and/or persistent storage drives. In some embodiments, multiple intermediary tiers, each comprising cache-containing devices, may be set up between a CPD tier and the analytics service for a given DORA. For example, one such tier may be set up at neighborhood level facilities of the organization on whose behalf the DORA is set up, and another such tier may be set up at a city headquarter premise of the organization. The computing and caching capabilities of the devices used at the different intermediary tiers may vary in at least some embodiments.

Depending on the needs of the client on whose behalf a DORA is configured, one or more types of actions may have to be initiated when an entity is recognized using the spatial index contents distributed among the tiers of the DORA. For example, an entrance door to a building may be automatically opened if an employee is recognized. Other types of actions may be initiated if/when a determination is made that an entity is not among the set of entities represented in the embedding vector repository 110 for the DORA—e.g., an un-recognized person wishing to enter a building may be notified that additional identification information is required. The actions may be initiated from and/or performed at any of the tiers of the DORAs in different embodiments. For example DORA-1 comprises a recognition-based action initiator (RAI) 139A at the CPD tier 130A, and another RAI 139B at ICS 142B of CND tier 140, either or both of which may initiate recognition-based operations. DORA-2 comprises an RAI 139K at the CPD tier 130B and an RAI 139L at BTC 120B. Individual ones of the RAIs may comprise some combination of software and hardware in the depicted embodiment. In some embodiments, different RAIs may be established for cases in which entities are recognized than for cases in which entities are not recognized; in other embodiments, a given RAI may initiate both types of actions.

In at least some embodiments, the BTC 120 of a given DORA may receive information about the set of CPDs and/or CNDs to be used for a given DORA, e.g., via programmatic interfaces from a client of the AS. Software components of the DORA (e.g., ASAs 133 and/or ASAs 145) may be transmitted to and installed at the CPDs and/or CNDs, and connectivity may be established among the tiers. The BTC 120 may provide confirmation to the client via the programmatic interfaces that connectivity has been successfully established between at least a selected subset of devices at the different tiers of the client's DORA in one embodiment. In some embodiments, the spatial index constructed for the DORA may be partitioned and distributed proactively among the CPDs and/or CNDs for local caching; in other embodiments, the spatial index may be distributed on demand in response to requests from the CPDs or the CNDs.

In various embodiments, resources at one or more of the external tiers of a DORA may periodically transmit messages to one or more other resources at the external tiers, and/or to the BTC of the DORA, to indicate that the resources that sent the messages are active and functional. The absence of such health indicator messages from a given CPD and/or a given CND may be interpreted as an indication that the CPD or CND has failed in some embodiments, and recovery operations (e.g., transferring responsibilities for caching a particular partition to a failover resource) may accordingly be initiated by the BTC in response to detecting such a failure.

In the embodiment depicted in FIG. 1, an embedding vector representing at least a portion of an image captured by a camera 131 may be obtained or generated at a CPD 132. Some CPDs may have enough computing capacity to execute the embedding machine learning model(s) locally; others may rely on ICSs or the BTC of their DORA to produce the embedding vector. A search may be conducted in the local cache 134 of the CPD to find pre-cached embedding vectors that meet a similarity threshold with respect to the newly-generated embedding vector. If a cache hit occurs, e.g., if an entity is recognized using the contents of the local cache, an RAI 139 may be informed of the recognized entity, and an action may be initiated. If a cache miss occurs, and a pre-cached embedding vector that meets the similarity criterion with respect to the newly-generated embedding is not found in the local cache, one or more relevant partitions of the spatial index of the DORA may be identified using a spatial index partition map (SIPM) in various embodiments. As discussed below in further detail, a copy of such an SIPM may be stored at each CPD in some embodiments. In other embodiments, the SIPM may be stored at one or more request routers of the DORA (which may for example be implemented at the CPD tier or the CND tier). The SIPM may in effect enable the ASA of the CPD at which a cache miss occurs to (a) identify which partition(s) of the spatial index are most likely to contain similar embedding vectors to the newly-generated embedding vector and (b) determine which specific resources of the DORA (e.g., other CPDs, CNDs and/or the BTC) are the best query targets from which the identified partitions can be obtained. Requests or queries for the identified relevant partitions may be directed to the target resources, and the requested partition(s) may be obtained at the CPD at which the cache miss occurred in various embodiments.

In at least some embodiments, at least a portion of the requested partition(s) may be stored in the local cache of the CPD after they are received, e.g., under the assumption that the content of the partition(s) may be re-used within a relatively short period of time at the CPD. The retrieved partition(s) may be searched to determine whether a sufficiently-similar embedding vector is present. If such a similar embedding vector is found, a corresponding recognition-based action may be initiated with the help of an RAI of the DORA in various embodiments. If a sufficiently similar embedding vector is not found even in the retrieved partition(s), an action based on non-recognition may be initiated in some embodiments. In at least one embodiment, in order to store the contents of a retrieved partition, some previously-cached embedding vectors may have to be evicted or discarded from the local cache of the CPD. Any of a variety of cache eviction victim selection policies, such as least recently used, first-in-first-out, and the like may be employed in different embodiments. Instead of obtaining an entire partition, in some embodiments an ASA may request that only a portion of a partition (e.g., a portion representing a region within a Euclidean distance DI of the newly-generated embedding vector) be sent from the target resources to which a query is directed, and such a subset of the partition may be cached locally. In at least one embodiment, instead of requesting and locally caching a partition, an ASA may simply request the target resource (e.g., an ASA at another CPD or CND) to conduct the search for a sufficiently similar embedding vector and provide the search results to the requesting ASA.

Example Use and Partitioning of Spatial Index

Figure 2:
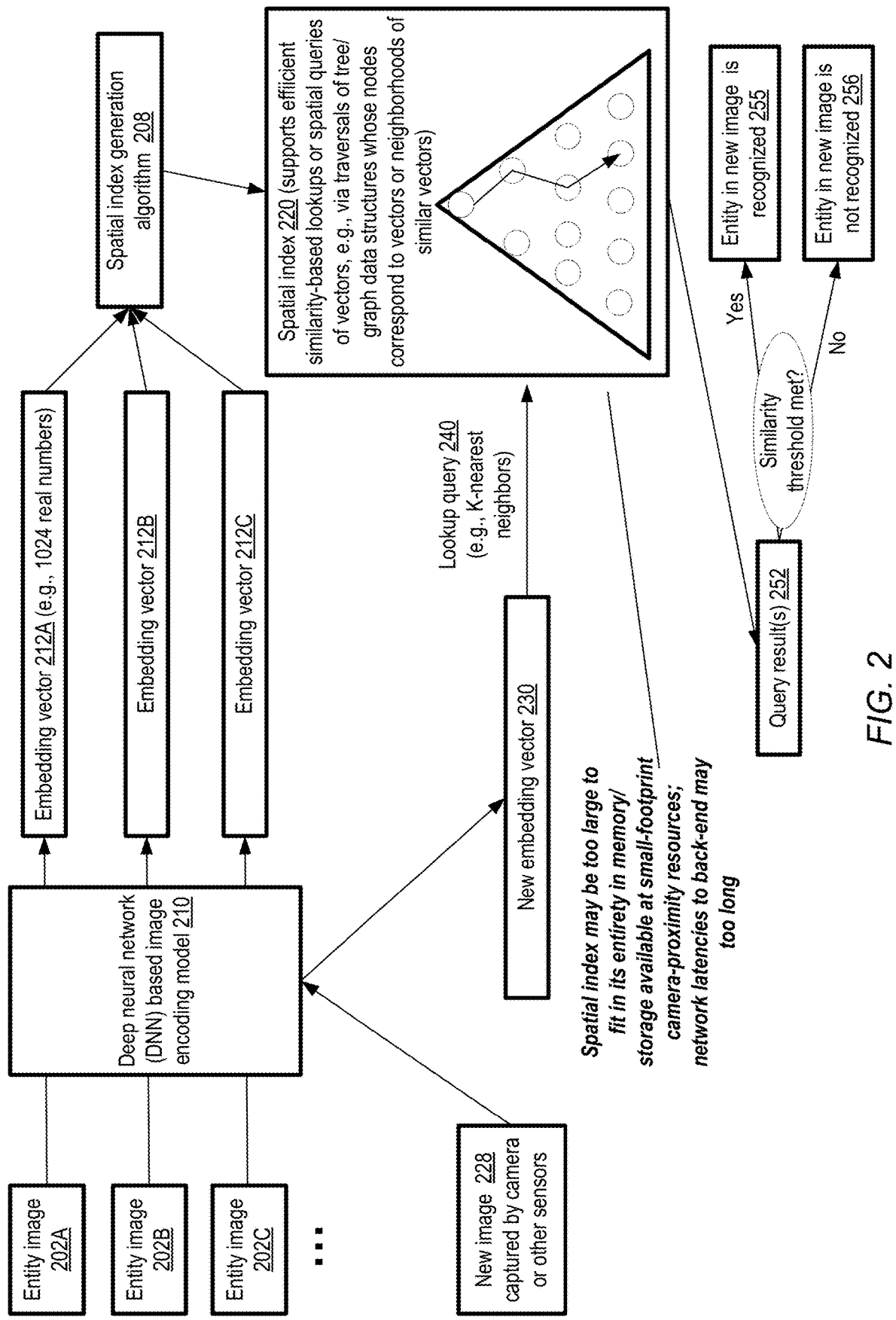
FIG. 2 illustrates an overview of an example technique utilizing spatial indices for object recognition, according to at least some embodiments.

FIG. 2 illustrates an overview of an example technique in which spatial indices are constructed and utilized for object recognition, according to at least some embodiments. A deep neural network (DNN) based image encoding model 210 may be used to produce respective high-dimension entity embedding vectors 212 representing respective learned features of each of a set of entity images 202 in the depicted embodiment. Thus, for example, embedding vectors 212A, 212B and 212C may be generated to represent features of entity images 202A, 202B and 202C respectively. In other embodiments, techniques that do not utilize DNNs may be employed to produce the embedding vectors. The dimensionality of the embedding vectors may vary in different embodiments, and may be selected for example based on the factors such as the accuracy or confidence level desired for entity recognition, the total number of entity images 202, the memory or storage size constraints of the devices at which the spatial index is to be used, and so on. In some implementations, a given embedding vector 212 may comprise, for example, 1024 real numbers, 512 real numbers, or 256 real numbers.

The embedding vectors 212 may collectively be referred to as baseline or authoritative embeddings in some embodiments, as they may represent an authoritative data set within which similarity-based searches with respect to new embeddings are conducted. The embedding vectors 212 may be provided as input to a spatial index generation algorithm 208, which may generate a spatial index 220 which supports efficient similarity-based lookups or spatial queries in the depicted embodiment. Any of a variety of data structures and corresponding index construction and query execution algorithms may be utilized in different embodiments, such as cover trees, hierarchical navigable small world graphs, and the like, as discussed below in further detail. Depending on the particular algorithms selected, at least some nodes of a tree or graph data structure used for the spatial index may represent respective embedding vectors 212, and/or may represent neighborhoods of similar embedding vectors. Traversals of the data structures in response to a query indicating an input embedding vector may quickly lead to portions of the index which are most likely to contain a matching embedding vector (i.e., an embedding vector which meets a similarity criterion with respect to the input embedding vector), so most of the index does not have to be examined for entity recognition.

When a new image 228 is captured by cameras and/or other sensors and is to be analyzed to determine whether it depicts one of the entities represented in the spatial index 220, the DNN based image encoding model 210 may be used to generate a new embedding vector 230. A lookup query 240 may then be directed to the spatial index 220 in the depicted embodiment. Any of several different types of queries may be used in different embodiments—e.g., queries which request that the K nearest neighbors in vector space of the new embedding vector be returned, or queries which request all the embedding vectors which lie within a specified distance radius of the embedding vector be returned. The spatial index may be searched, and one or more query result(s) 252 may be obtained in various embodiments. The query result(s) may indicate zero or more embedding vectors which meet the query criteria. If more than zero embedding vectors are indicated in the query results, a final similarity analysis may be conducted in some embodiments. If a similarity threshold is met with respect to the new embedding vector by at least one of the result vectors, an entity in the new image may be said to be recognized, as indicated in element 255 of FIG. 2. If zero result vectors are obtained, or if none of the result vectors meet the similarity criterion, a decision may be made that the new image does not contain a recognized entity, as indicate din element 256. Appropriate actions may be initiated based on whether an entity was recognized or not, and if so, which particular entity as recognized in at least some embodiments. Note that the set of baseline or authoritative entity images 202 may change over time, in which case the spatial index 220 may be regenerated as needed.

In scenarios in which (a) the size of the spatial index 220 is substantial (e.g., several gigabytes) and (b) entity recognition is preferably to be performed very quickly, e.g., using camera-proximity computing devices which have relatively small amounts of storage, memory or computing capacity, providing the entire spatial index to each of the camera-proximity devices may not be feasible, and the network latencies to back-end resources at which the entire spatial index can be stored may be too high. In such scenarios, a spatial index partitioning scheme similar to that shown in FIG. 3 may be employed in some embodiments.

Figure 3:
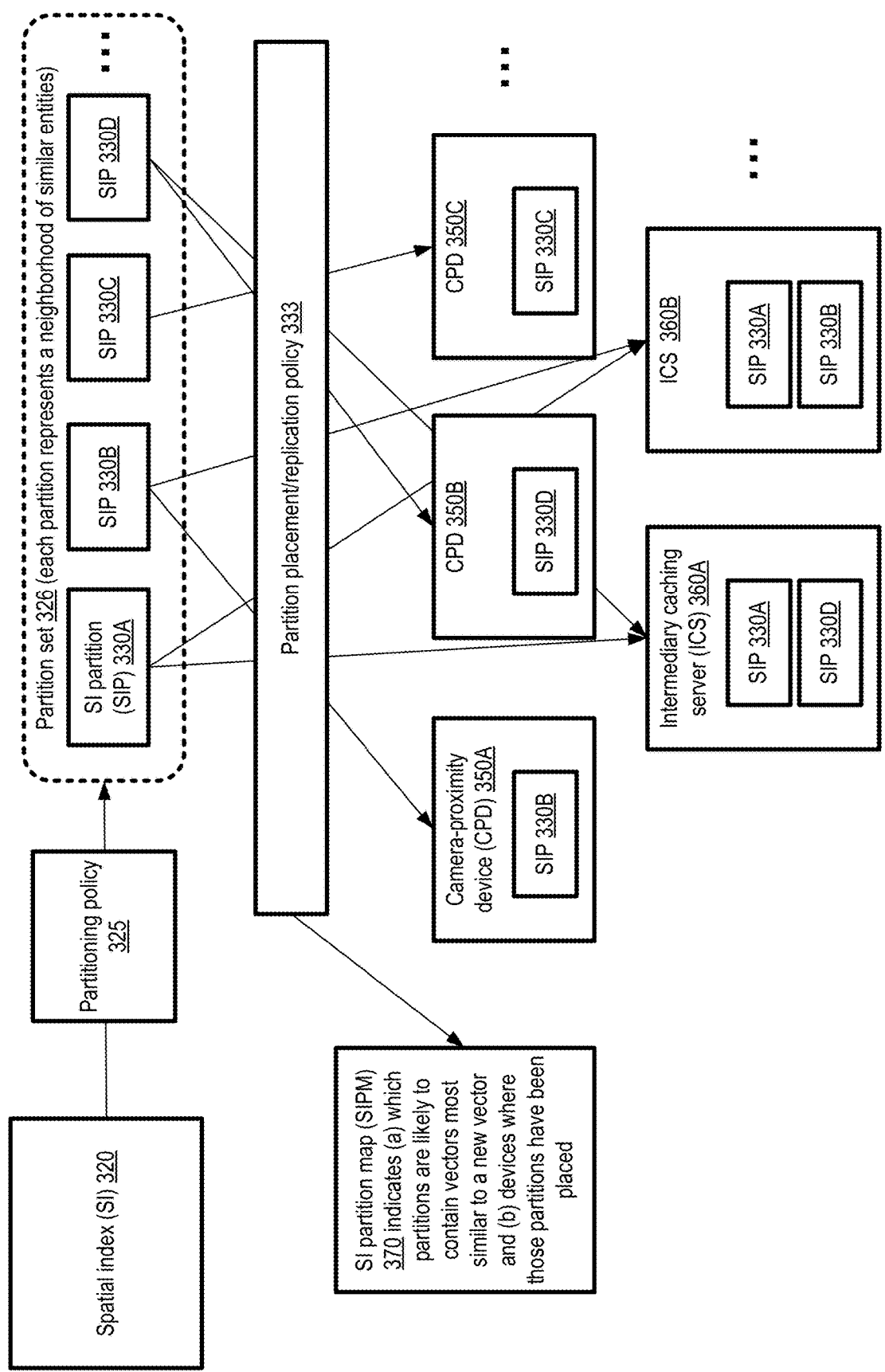
FIG. 3 illustrates an example scenario in which spatial indices may be partitioned and distributed among resources at one or more tiers of a distributed object recognition application, according to at least some embodiments.

FIG. 3 illustrates an example scenario in which spatial indices may be partitioned and distributed among resources at one or more tiers of a distributed object recognition application, according to at least some embodiments. In the embodiment shown in FIG. 3, a partitioning policy 325 may be employed to divide a spatial index (SI) 320 into a set 326 of SI partitions (SIPs) 330, such as SIP 330A, 330B, 330C and 330D. Each of the SI partitions 330 may be assigned a unique partition identifier in some embodiments. In some embodiments, the partitioning policy may be implemented by a back-end task coordinator (BTC) of an analytics service similar in features and functionality to AS 105 of FIG. 1. Each partition may represent a respective neighborhood within the high-dimensionality embedding vector space used to represent the entities with respect to which similarity-based lookups are to be performed in the depicted embodiment. On average, if an embedding vector $EV_i$ is placed in a particular partition such as 330A in the embodiment shown in FIG. 3, this would imply that another embedding vector $EV_k$ which is placed a different partition such as 330B is likely to be more distant in the vector space from $EV_i$ than another embedding vector $EV_j$ which is placed in $EV_i$'s partition. Stated another way, if $EV_i$ represents entity $E_j$, $EV_k$ represents entity $E_k$ and $EV_j$ represents entity $E_j$ in the above example, the similarity between $E_i$ and $E_j$ is likely to be greater than the similarity between $E_j$ and $E_k$, and the similarity between $E_i$ and $E_j$ is also likely to be greater than the similarity between $E_j$ and $E_k$. Note that while such relationships may hold on average, depending on the algorithms used for the spatial index and for partition, it may be the case in at least some implementations that for a few pairs of embedding vectors located closer to the edges of the neighborhoods represented by the partitions, such relationships may not necessarily hold.

A partition placement/replication policy 333 may be implemented to determine how SIPs 330 are to be distributed among resources at the external tiers of a DORA (e.g., the CPD tier and/or the CND tier) in the depicted embodiment. In at least some embodiments, the decisions as to which CPDs and CND tier servers are to cache a given SIP may be made by a central authority (e.g., a BTC or a request router of the kind discussed below). In other embodiments, such central decision making may not be required, and a deterministic partition-to-resource mapping algorithm may be implemented at any of the DORA tiers to determine the specific resources which are assigned to store a given SIP. In the depicted example scenario, CPD 350A may be assigned SIP 330B, CPD 350B may be assigned SIP 330D, and CPD 350C may be assigned SIP 330C. Intermediary caching server (ICS) 360A of a CND tier is assigned to store SIPs 330A and 330D, while ICS 360B is assigned to store SIP 330A and 330B. Copies of a given partition may be stored at several resources across one or more tiers of the DORA in the depicted embodiment—e.g., SIP 330B is stored at CPD 350A and ICS 360B, and SIP 330A is stored at ICS 360A and 360B.

In various embodiments an SI partition map (SIPM) 370 may be constructed (e.g., at a BTC) and provided to various other resources of the DORA. An SIPM may indicate (a) which SIPs are likely to contain vectors most similar to a given new vector and (b) the specific devices/resources which have been assigned to store those SIPs. Such SIPs may be utilized to route partition queries in some embodiments as discussed below in further detail.

In some embodiments, as mentioned earlier, the membership of an underlying authoritative entity image set for which a spatial index is created may change over time, as new images are added or some images are removed. In at least some embodiments, such membership changes may lead to a reconstruction/regeneration of the spatial index, which in turn may trigger changes to the membership of individual partitions (or even to changes in the number of partitions into which the spatial index is divided). Changes to a partition set 326 may result in changes to the set of partitions assigned to individual resources such as CPDs or ICSs. Partition assignments may in some embodiments also be changed if/when new CPDs and/or new ICSs are added to a DORA, e.g., at the request of a client. In at least some embodiments, such assignment changes and/or repartitioning of a spatial index of a DORA may be orchestrated by a BTC of the DORA.

Example Use of Spatial Index Partition Map

Figure 4:
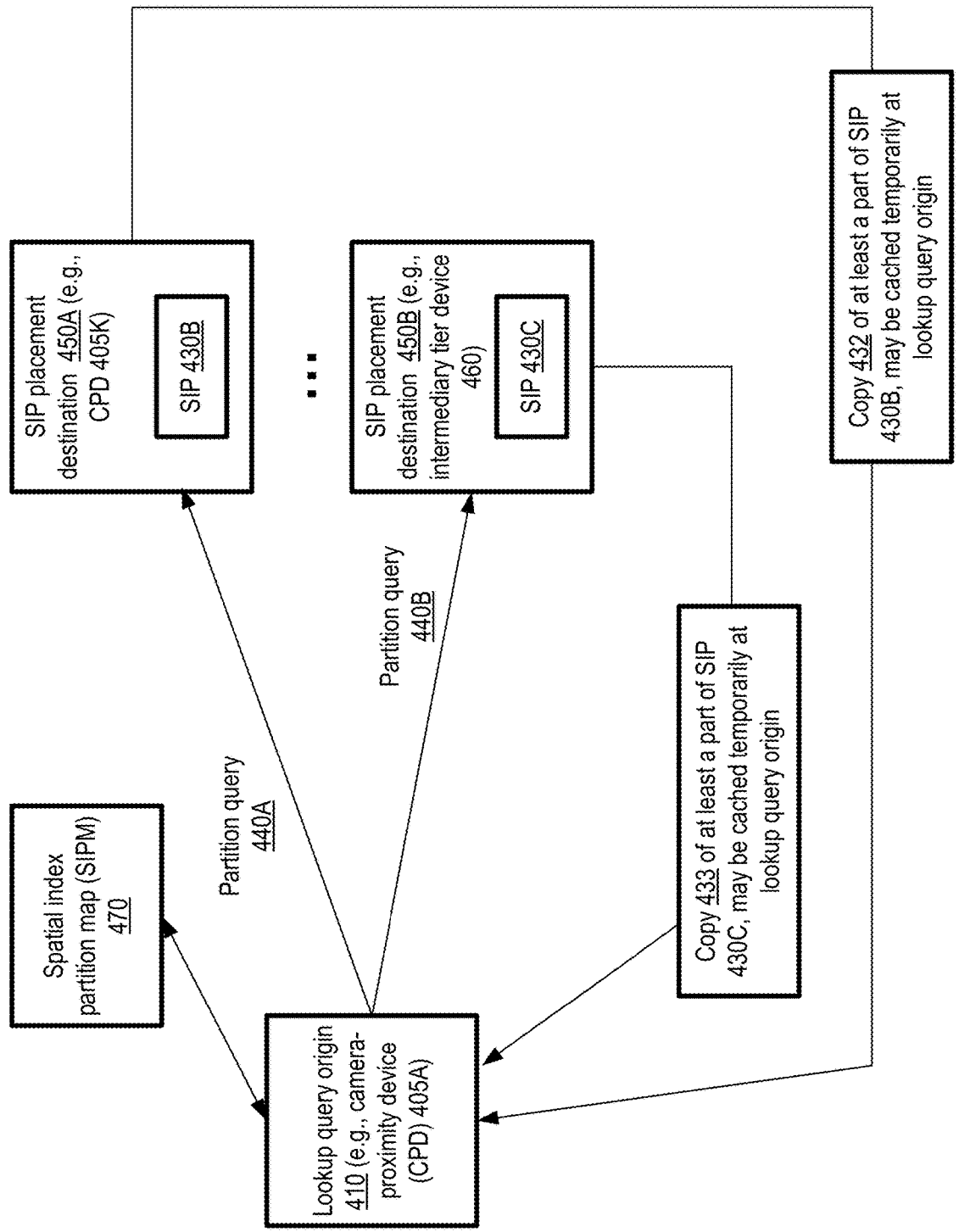
FIG. 4 illustrates an example use of a partition map for reducing the number of spatial index partitions which may have to be searched for object recognition, according to at least some embodiments.

FIG. 4 illustrates an example use of a partition map for reducing the number of spatial index partitions which may have to be searched for object recognition, according to at least some embodiments. In the depicted scenario, a lookup query to find similar embedding vectors for a particular input embedding vector may be generated at a lookup query origin 410 (e.g., a camera-proximity device (CPD) 405A) of a DORA in response to a cache miss in the local cache (e.g., when a pre-cached vector which is sufficiently similar to the input vector is not found in the local cache). A spatial index partition map (SIPM) 470 constructed for the spatial index of the baseline or authoritative embeddings may be consulted to identify one or more query targets from which one or more partitions relevant to the input embedding vector can potentially be retrieved.

In the depicted example scenario, two partitions, SIP 430B and SIP 430C are identified as relevant to the input embedding vector. Two query targets are identified using the SIPM: SIP placement destination 450A (which may for example be another CPD 405K, at the same tier as the lookup query origin 410) which is assigned SIP 430B, and SIP placement destination 450B (e.g., an intermediary tier device 460 at a different tier from that of the lookup query origin 410) which is assigned SIP 430C. Respective partition queries 440A and 440B (which may also be referred to as partition requests) may be sent to the respective query targets, e.g., from the lookup query origin 410 or from the device at which the SIPM 470 is stored. The contents of a partition query 440 may differ from one implementation to another. In one implementation, for example, the input embedding vector may be included in the query. In another implementation, the identifier of the relevant partition may be included in the query.

A respective copy of at least a portion of the relevant SIP may be transmitted to the lookup query origin 410 from an SIP placement destination 450 in the depicted embodiment. Thus, SIP placement destination 450A may send copy 432 of at least a part of SIP 430B to lookup query origin 410, while SIP placement destination 450B may send copy 433 of at least a part of SIP 430C. In at least one embodiment, the partition query may indicate a targeted response size or vector count. For example, partition query 440A may specify that one megabyte of SIP contents, comprising as many embedding vectors among those closest or most similar to the input embedding vector within SIP 430B which can fit within one megabyte, selected based on their proximity to the input embedding vector, are to be provided. In another example, a partition query such as 440A may specify that N vectors, selected based on their proximity to the input embedding vector, should be provided to the lookup query origin. The portion (or all) of the SIPs obtained at the lookup query origin may be cached at least temporarily at the lookup query origin in various embodiments, e.g., in accordance with caching policies selected for the DORA.

In some embodiments in which copies of a given relevant SIP are available from multiple devices, respective partition requests for that SIP may be transmitted to several or all of those devices. In one such embodiment, if two devices each provide their copy of the same SIP (or same portion of the same SIP), the copy that reaches the lookup query origin may be stored in its local cache, while the remaining copies may be discarded. In some embodiments, multiple SIPS may be searched (e.g., in parallel and potentially using different devices to conduct the searches) to identify some number of "nearest neighbor" embedding vectors or most similar pre-existing embedding vectors found in the SIPs with respect to the embedding vector of a newly-generated image. Then the identified pre-existing embedding vectors may be ranked relative to one another to identify the single most similar pre-existing image. If the vector of the highest-ranked pre-existing image satisfies a similarity criterion with respect to the vector of the newly-generated image, a recognition-based action may be initiated; if the similarity criterion is not met, an action based on a lack of recognition may be initiated. In some cases, multiple pre-existing vectors may satisfy the similarity criterion, and the one that is the most similar (the one that is most highly ranked in the ranked list of vectors) among them to the newly-generated vector may be chosen as representing the "recognized" entity and be used as the basis for the recognition-based action. Note that the distributed techniques introduced herein (including the techniques shown in FIG. 3 and FIG. 4) may be used to identify objects/entities within a wide variety of types of content items in different embodiments— e.g., within images, videos, text documents and the like.

Example Distribution of Spatial Index Partition Maps

Figure 5:
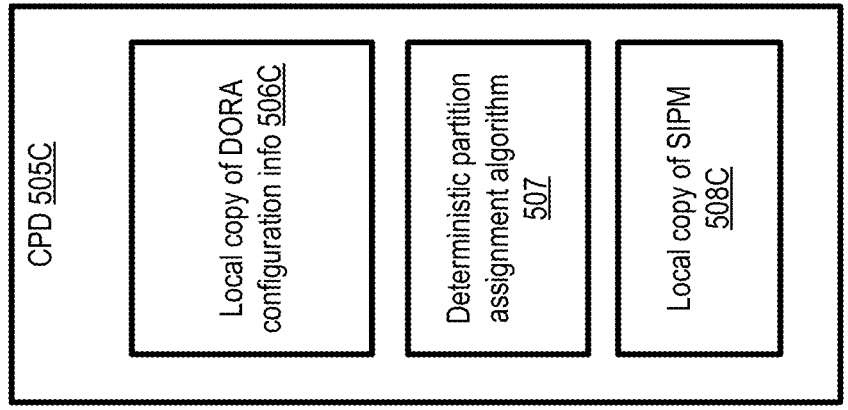
FIG. 5 illustrates an example technique in which multiple camera-proximity devices may store respective copies of a spatial index partition map, according to at least some embodiments.
Figure 5:
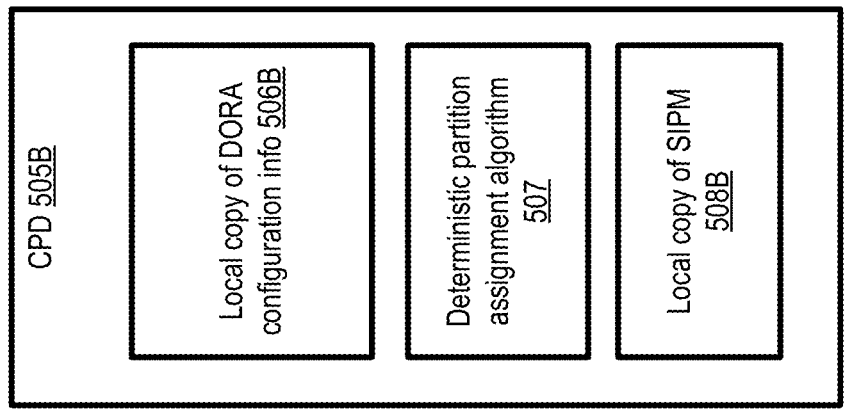
Figure 5:
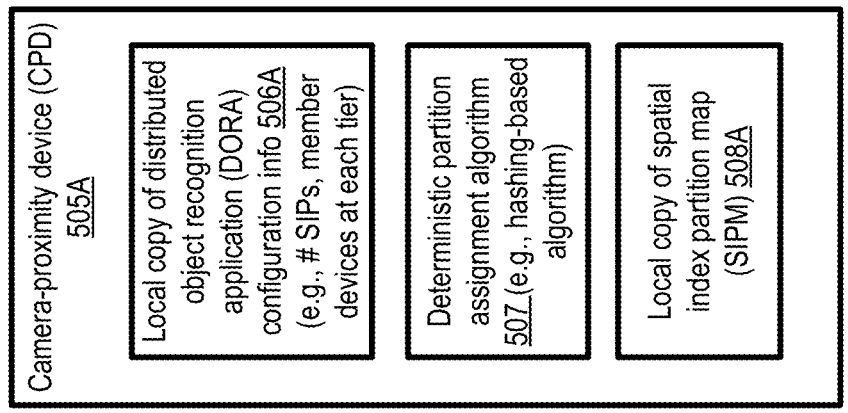

FIG. 5 illustrates an example technique in which multiple camera-proximity devices may store respective copies of a spatial index partition map, according to at least some embodiments. At each of several camera-proximity devices (CPDs) 505, a respective local copy of DORA configuration information 506 (provided to the CPD for example by a back-end task coordinator (BTC) of the DORA) may be stored in the depicted embodiment. The configuration information may indicate the total number of partitions into which the spatial index being used is divided, as well as the number of devices that make up each external tier of the DORA in various embodiments.

In some embodiments, program code implementing a deterministic partition assignment algorithm 507 may be obtained and run at each of the CPDs 505 of the DORA. For example, in some embodiments, a hashing based algorithm may be used, which takes a partition identifier as input and generates output identifying one or more placement destinations for the partition with that partition identifier.

Using such an algorithm 507 and the configuration information, a local copy of a spatial index partition map (SPIM) 508 may be generated independently at each of the CPDs in the depicted embodiment. Thus, local copy 508A of the SPIM may be generated at CPD 505A using local copy of configuration information 506A, local copy 508B of the SPIM may be generated at CPD 505B using local copy of configuration information 506B, and local copy 508C of the SPIM may be generated at CPD 505C using local copy of configuration information 506C in the depicted example scenario. Because the algorithm 507 is deterministic, the local copies of the SPIM may be consistent with one another as long as the configuration information available at the CPDs remains consistent in various embodiments. In at least some embodiments, if/when the configuration information changes, it may be rolled out to the CPDs from the back-end tier of the DORA. Depending on the stringency of the accuracy requirements of the DORA, the back-end tier may allow some SPIM copies to temporarily differ from other SPIM copies when such configuration changes occur in some embodiments (because the changes to the configuration information may not be made as a single atomic operation across all CPDs). As such, the local SPIM copies may be configured to be eventually consistent rather than exactly consistent at all times in such embodiments. Note that although only CPDs are shown in FIG. 5, similar local copies of the SPIM may also be generated autonomously and independently at intermediate tier devices and/or at the BCTs in at least some embodiments.

Figure 6:
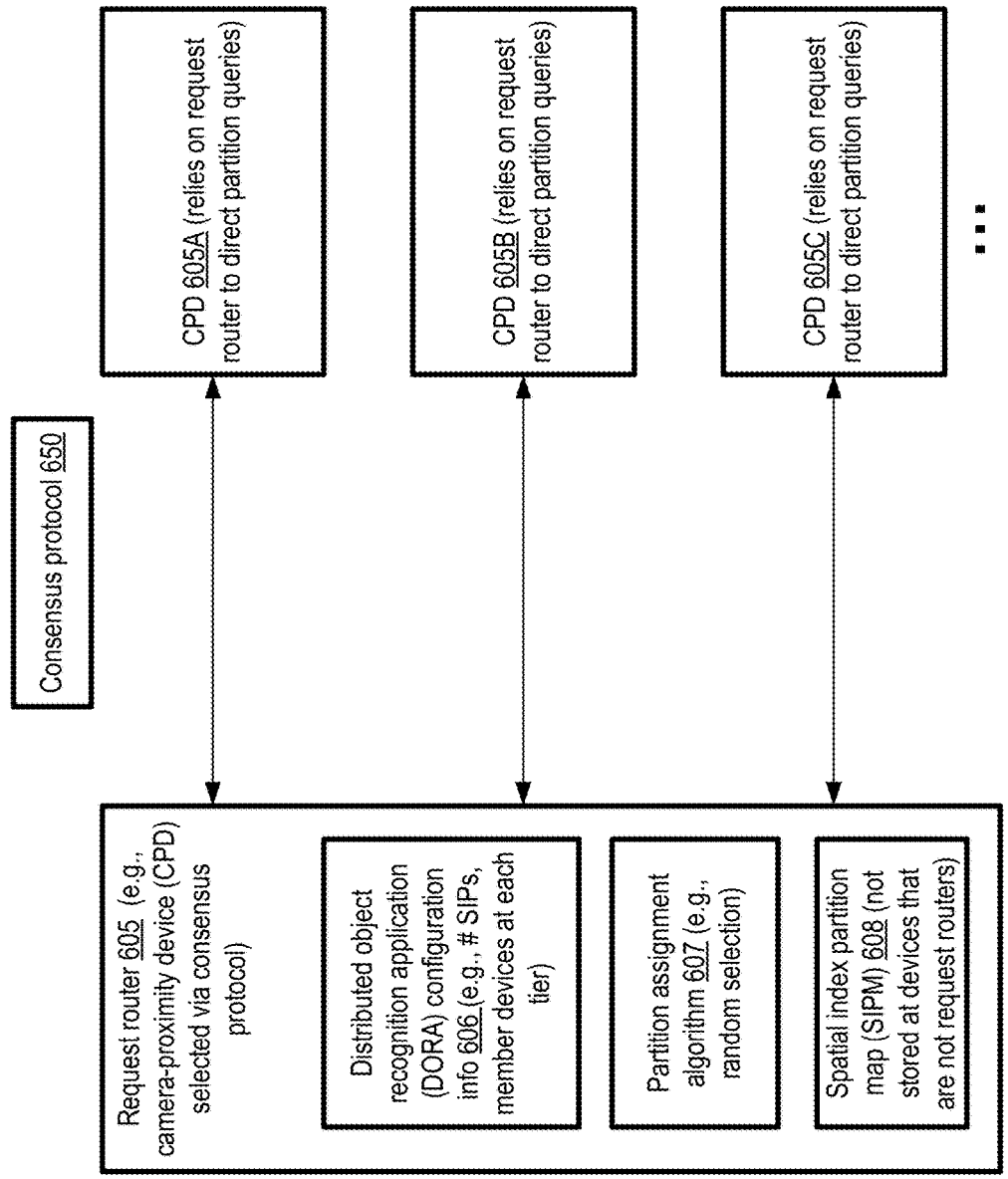
FIG. 6 illustrates an example technique in which camera-proximity devices may communicate with a request router, selected using a consensus protocol, which maintains a spatial index partition map, according to at least some embodiments.

In some embodiments, a different, more centralized approach may be taken with respect to SPIM management than that shown in FIG. 5. FIG. 6 illustrates an example technique in which camera-proximity devices may communicate with a request router, selected using a consensus protocol, which maintains a spatial index partition map, according to at least some embodiments. One or more request routers 605 may be designated for an external tier of a given DORA in the depicted embodiment. In some embodiments, one or more CPDs may be selected as request routers using consensus protocol 650 by all (or a majority of) the CPDs of the CPD tier of the DORA, while one or more intermediate tier devices (e.g., intermediary caching servers similar to ICSs 142 of FIG. 1) may similarly be selected as request routers by the devices at the intermediate tier, and so on. In one embodiment, a given request router may be used for multiple external tiers of the DORA. In some embodiments, instead of utilizing a consensus protocol, a back-end component of a DORA (such as a BTC) may choose one or more devices at the external tiers as request routers.

A request router 605 may be provided DORA configuration information 606 in the depicted embodiment, e.g., by a BTC of the DORA. The configuration information 606 may indicate the total number of partitions into which the spatial index being used for the DORA is divided, as well as the number of devices that make up each external tier of the DORA in various embodiments. The request router may implement a partition assignment algorithm 607 (e.g., using random selection for placing partitions, or using a deterministic hashing based algorithm) to generate a spatial index partition map SIPM 608. SIPM 608 may be maintained only at request routers, and may not be propagated to devices that are not request routers in the depicted embodiment. When a device such as CPD 605A, 605B or 605C needs to consult the SPIM, e.g., in the event of a cache miss of the kind discusses earlier, a request to identify relevant SIPs and query targets may be sent from the CPD to the request router in the depicted embodiment. In some embodiments, the request router may provide a list of relevant partitions and corresponding devices at which the relevant partitions are expected to be stored to the requesting CPD. In other embodiments, the request router may itself request the relevant partitions from the devices at which they are stored, and transmit the partitions back to the CPDs at which the cache miss occurred. Of course, if a CPD is chosen as a request router, that CPD may use the SIPM it has generated locally.

Example Data Structures for Spatial Indices and Partition Maps

Figure 7:
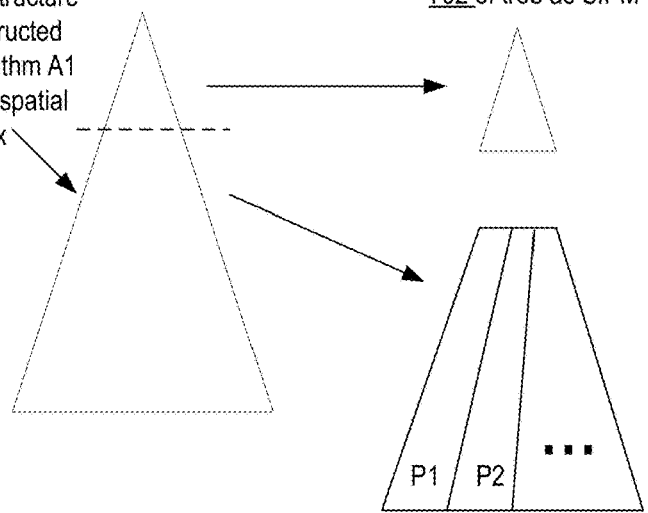
FIG. 7 illustrates example alternative data structures which may be utilized for partitioning a spatial index, according to at least some embodiments.
Figure 7:
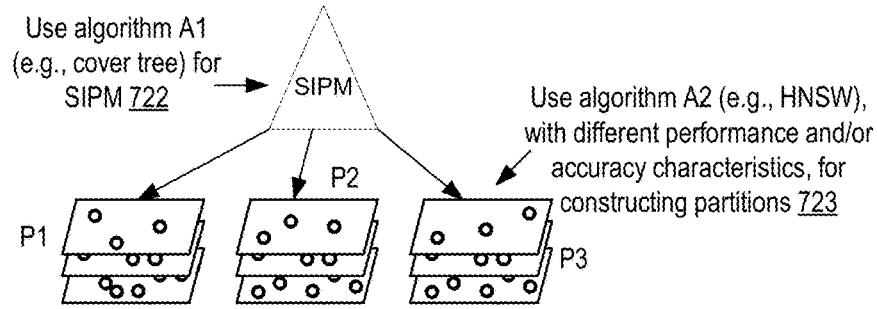
Figure 7:
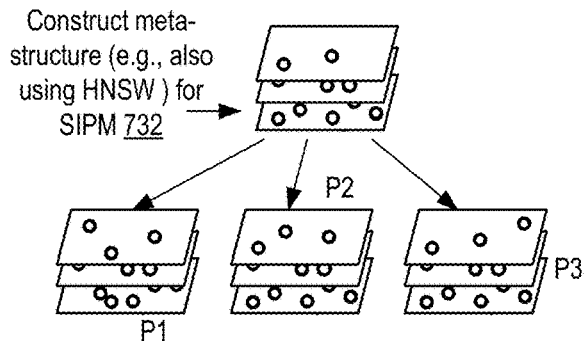

FIG. 7 illustrates example alternative data structures which may be utilized for partitioning a spatial index, according to at least some embodiments. In partitioning approach 751, a tree data structure 701 may be constructed as a spatial index. At least some nodes of the tree may represent respective embedding vectors; other nodes may represent groups or neighborhoods of embedding vectors. The tree data structure may be traversed from the root (the top of the tree) towards the leaves in response to a similarity query or spatial search with respect to an input vector in various embodiments. For example, at each layer of the tree, the next node may be selected as the one with the smallest Euclidean distance from the input vector, among the set of nodes at that layer. As one traverses the tree towards the leafs, one reaches tree subsets or branches representing smaller neighborhoods within the vector space used for representing the entities for which the spatial search is conducted. At least a portion of a first set of layers of the tree (e.g., the top few layers 702) may be designated as an SIPM in approach 751, while the remaining layers 703 may be divided into partitions P1, P2, etc. Any of a variety of tree data structures 701 may be used in different embodiments, such as cover trees, K-dimensional trees, and the like. Multi-layered data structures which are not trees per se may be used in some embodiments, with some layers being used as the SIPM and other layers being divided into partitions.

In a second partitioning approach 752, a different algorithm may be used for the SIPM than is used for the partitions of the spatial index. For example, an algorithm A1 (e.g., a cover tree algorithm) may be used for the SIPM 722, while algorithm A2 (such as HNSW), which may have different performance and/or accuracy characteristics than A1, may be used for constructing partitions 723. In one such implementation, a cover tree may first be constructed top-down, and an HNSW graph may then be constructed bottom up for each of the partitions corresponding to one or more leaf nodes of the cover tree. Individual partitions such as P1, P2 etc., managed using a cover-tree based SIPM may be constructed independently of one another, e.g., at least partially in parallel in some embodiments.

In a third partitioning approach 753, lower-level data structures 733 representing respective partitions of the spatial index may first be constructed, e.g., in a bottom-up manner using an algorithm such as HNSW. Then, a meta structure (e.g., also comprising an HNSW graph) may be constructed for SIPM 732, starting with the graph nodes at the top layers of the lower-level structures. The particular partitioning approach used for a given DORA may be selected based on a variety of factors in different embodiments, such as the targeted exactness or accuracy of the spatial search results desired, the rapidity with which the results are to be provided, how frequently the spatial index and SIPM is expected to be reconstructed, and so on. In at least one embodiment a client on whose behalf the spatial index is constructed may indicate a preferred data structure and/or algorithm to be employed for a spatial index and accompanying SIPM. Other partitioning approaches and data structures, not shown in FIG. 7, may be employed in different embodiments.

Example Programmatic Interactions

Figure 8:
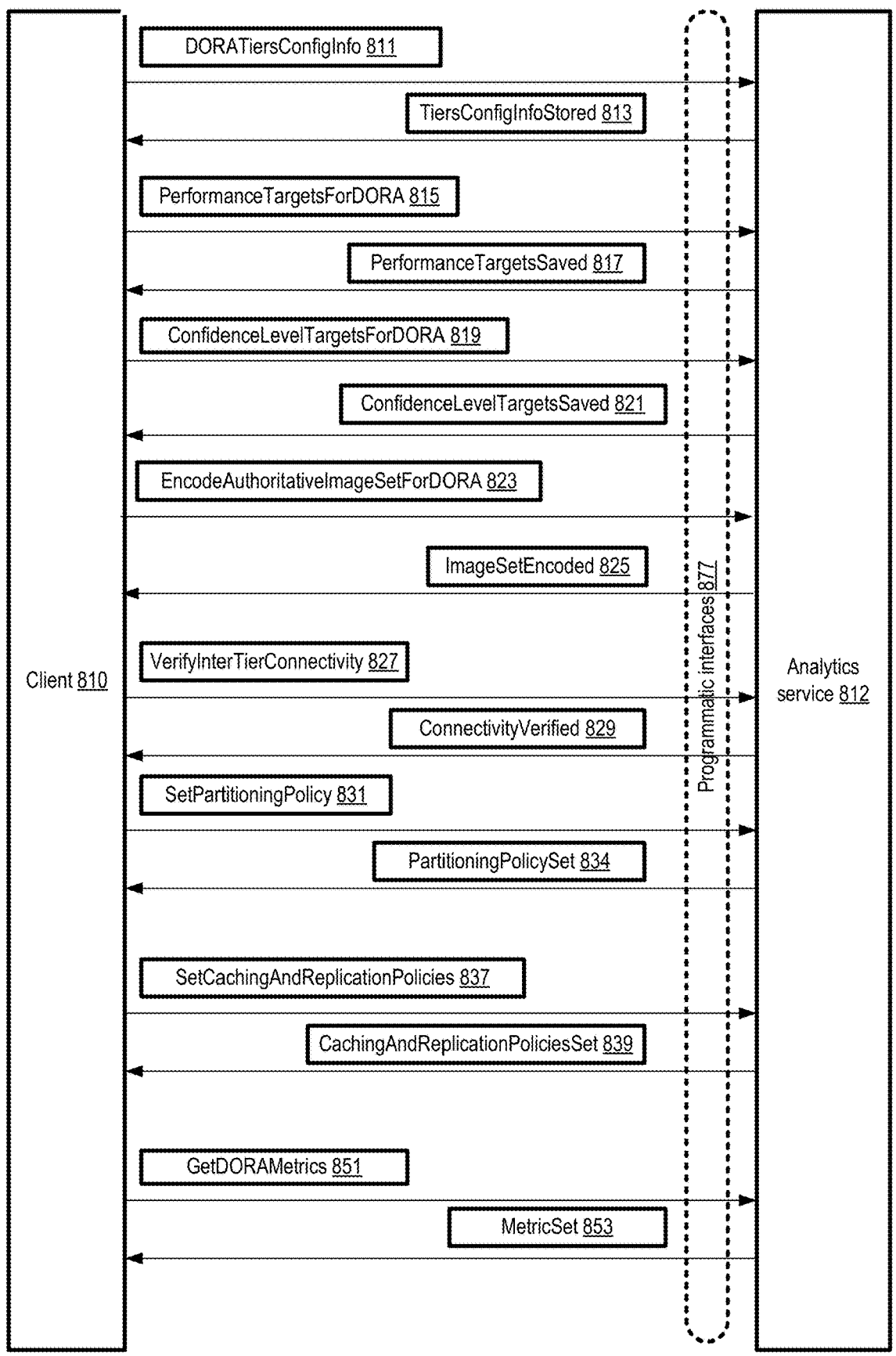
FIG. 8 illustrates example programmatic interactions between a client and an analytics service which coordinates operations of a distributed object recognition application, according to at least some embodiments.

FIG. 8 illustrates example programmatic interactions between a client and an analytics service which coordinates operations of a distributed object recognition application, according to at least some embodiments. An analytics service 812, similar in features and functionality to analytics service 105 of FIG. 1, may implement a set of programmatic interfaces 877 in the depicted embodiment. The programmatic interfaces 877 may include, for example, one or more web-based consoles, graphical user interfaces, command line tools, application programming interfaces (APIs) and the like. The programmatic interfaces may be used by clients 810 of the analytics service to submit messages pertaining to the configuration and management of distributed object recognition applications in behalf of the clients, and to receive corresponding responses in various embodiments.

Clients 810 may include, for example, administrators of office campuses at which entity recognition techniques are utilized for allowing or blocking entry into office buildings, administrators/owners of cashier-less retail or grocery stores at which entity recognition techniques are to be used for tracking the items that customers wish to purchase, and so on.

A client 810 may submit data about the resources or devices to be included in the external tiers of a DORA via one or more DORATiersConfigInfo messages 811 in the depicted embodiment. The information provided may include, for example, the number, physical locations and network addresses of camera-proximity or sensor-proximity devices, the number, physical locations and network addresses of intermediary tier devices such as client-network servers, the computing, memory and storage capabilities of the devices, the desired extent of connectivity between the devices (e.g., how many other devices at the same tier a given device is to be connected to for the purposes of entity recognition, how many other devices at other tiers a given device is to be connected to), and so on. The configuration data mat be stored in a DORA metadata store of the analytics service in the depicted embodiment, and a TiersConfigInfoStored message 813 may be sent as an acknowledgement to the client. Note that as and when devices at various tiers are added or removed over time, the client may provide information about the changes to the configuration via addition DORATiersConfigInfo messages 811 in at least some embodiments.

In at least one embodiment, the configuration information provided in a DORATiersConfigInfo message may include an indication of one or more inter-tier query initiation thresholds. Such thresholds may indicate conditions under which queries are to be sent from one tier to another after conducting a search using the partitions available at the local tier. For example, consider a scenario in which in order to decide that a newly-generated embedding vector is sufficiently similar to another which is represented in the spatial index, a Euclidean distance (the similarity metric) computed between the two vectors has to be less than T1. Assume further that in response to a cache miss with respect to a new embedding vector NV at a particular CPD CPD1, a partition P1 is retrieved from a different CPD CPD2, and a spatial search is conducted within P1. If the nearest neighbor found to NV within P1 has a Euclidean distance of T2 from NV, and T2 exceeds an inter-tier query initiation threshold T3 specified by the client, a query indicating NV may be sent to another tier (e.g., an intermediary tier or the provider network tier) in some embodiments, e.g., to make sure that the other tiers do not have recently-added embedding vectors which might satisfy the T1-based similarity criterion.

In at least some embodiments a client 810 may use programmatic interfaces 877 submit an indication of one or more types of performance requirements for a DORA, e.g., via one or more PerformanceTargetsForDORA messages 815. The performance requirements or targets may, for example, include targeted maximum or average latencies for completing a spatial search or lookup, a maximum network bandwidth usage (e.g., for traffic between the back-end or provider network tier of a DORA, and the external tiers of the DORA) as a function of the amount of baseline or authoritative image data for which spatial searches are to be conducted, and so on. The performance requirements may be saved at the analytics service, and a PerformanceTargetsSaved message 817 may be sent to the client in some embodiments. The performance requirements may later be used to make decisions regarding spatial index algorithm selection, caching policies, partitioning policies, partition replication policies and the like in some embodiments. For example, in an attempt to ensure that the performance target is met, a given partition may be replicated at several different CPDs (e.g., a set of CPDs that are physically well-distributed around the premises of the CPD tier, such that a copy of any given partition can be accessed relatively quickly from anywhere in the premises). When a cache miss occurs at a particular CPD, respective partition requests or queries may be sent out in parallel to each of the different CPDs at which a relevant partition was replicated. Each of the CPDs receiving a request may send a copy of the relevant partition to the particular CPD as quickly as possible, and the copy which is obtained fastest may be used to search for a vector similar to the one for which the cache miss occurred, with the copies that are obtained later being discarded.

A client 810 may provide targets for the confidence level or accuracy levels of the lookups conducted for a DORA in some embodiments via one or more ConfidenceLevelTargetsForDORA messages 819. The client may, for example, indicate that recognitions of entities reported by the DORA have to have an X % confidence level associated with them. Such confidence level targets may also be used to make various DORA configuration decisions at the analytics service, such as the selection of the spatial index algorithm. After the confidence level information is received and stored, a ConfidenceLevelTargetsSaved response 821 may be sent to the client in some embodiments.

In some embodiments a client may provide information about an authoritative image set from which embedding vectors are to be extracted at the analytics service for a DORA, e.g., via one or more EncodeAuthoritativeImageSetForDORA messages 823. Encodings such as embedding vectors for the individual images of the set may be generated at the analytics service 812, e.g., using pre-trained DNN models in some embodiments, and an ImageSetEncoded message 825 may be sent to the client to indicate when all the encodings have been prepared. A client may add new images to the image set (or remove earlier-provided images) as desired, and sent additional messages via programmatic interfaces 877 indicating the changes in various embodiments. Such changes may lead to regeneration or updates to the spatial indices, SIPs, SIPMs, and/or mappings between partitions and placement destinations in some embodiments, which may be coordinated via the back-end resources of the analytics service.

Before the automated recognition of entities via a DORA is activated, in some embodiments a client may wish to ensure that the devices at each of the tiers have been configured correctly. A VerifyInterTierConnectivity request 827 may be submitted via interfaces 877 to check the configuration in the depicted embodiment. In response, the analytics service may conduct one or more connectivity tests, in which for example each of the analytics service agents or ASAs at the devices of the external tiers are contacted from the provider network components of the DORA in some embodiments. After the connectivity and/or functional state of each of the devices at the external tiers has been checked, a Connectivity Verified message 829 may be sent to the client 810 in one embodiment. In some embodiments, as part of the configuration tasks performed by the BTCs, connectivity between the different tiers may be verified proactively before the DORA is activated, and/or verified periodically after activation, and a client may not necessarily have to submit a VerifyInterTierConnectivity request to receive a Connectivity Verified message confirming that the devices of the DORA are configured as expected.

Some clients 810 may wish to specify caching, partitioning and/or partition replication policies to be utilized in their DORAs. Such policies may, for example indicate how the spatial index is to be subdivided, how many partitions are to be created, the algorithms to be used to map partitions to devices or place partitions, whether partitions are to be replicated and if so how many replicas are to be stored and at which devices, how long partitions retrieved from another resource are to be retained in a cache (e.g., by specifying one or more retention period parameters), cache replacement victim selection policies and so on. Such policies may be indicated or modified via SetPartitioningPolicy requests 831 and SetCachingAndReplicationPolicies requests 837 in the depicted embodiment. After the requested policies are stored and put into effect, in some embodiments a PartitioningPolicySet message 834 or a CachingAndReplicationPoliciesSet message 839 may be sent to the client. In some embodiments, separate messages may be used for specifying caching-related and replication-related preferences. In accordance with a replication policy, in one embodiment a given CPD may propagate copies of a received partition to one or more other CPDs and/or to one or more devices at other tiers of the DORA.

In various embodiments, a client 810 may wish to obtain metrics pertaining to a DORA set up on behalf of the client. A GetDORAMetrics request 851 may be sent via programmatic interfaces by the client to the analytics service in some such embodiments, and one or more metrics collected by the analytics service may be provided to the client in response in a MetricSet message 853. In some embodiments, the metrics may be presented via a graphical or visualization interface such as a dashboard which shows the devices at the different tiers of the DORA with associated metrics. Metrics presented to the user may include, for example, resource utilization levels (e.g., CPU or GPU utilization levels, memory/storage utilization levels) at some or all of the devices at the external tiers as well as at the provider network tier, cache hit rates and miss rates at various devices of one or more tiers, the number of messages exchanged between various pairs of devices within or across tiers, the network bandwidth used for such messages, the number of configuration-related messages exchanged, the number of entities recognized as a fraction of the number of entity recognitions attempted, and so on. In some embodiments, programmatic interactions other than those shown in FIG. 8 may be supported by the analytics service.

Methods for Distributed Object Recognition

Figure 9:
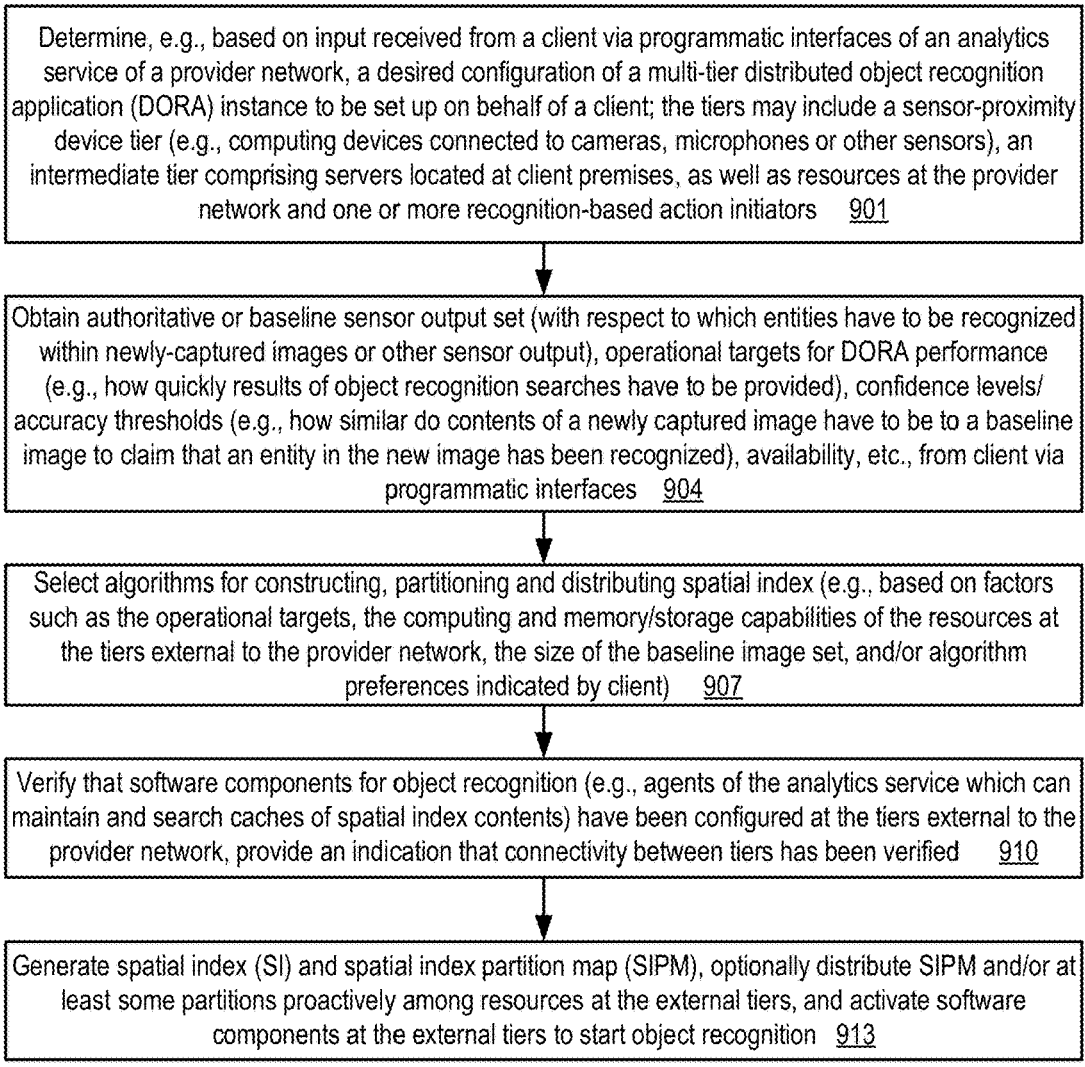
FIG. 9 is a flow diagram illustrating aspects of operations that may be performed to configure and activate a multi-tier distributed object recognition application, according to at least some embodiments.

FIG. 9 is a flow diagram illustrating aspects of operations that may be performed to configure and activate a multi-tier distributed object recognition application, according to at least some embodiments. As shown in element 901, information about the desired configuration of a multi-tier distributed object recognition application (DORA) instance to be set up may be obtained. In some embodiments, for example, the configuration information may be provided via programmatic interfaces by a client of an analytics service (similar in functionality to analytics service 105 of FIG. 1) of a provider network. The tiers may, for example, include a sensor-proximity device tier (e.g., computing devices connected to cameras, microphones, weight sensors, motion sensors, LIDAR detectors, thermal scanners, document scanners and the like), an intermediate tier comprising servers located at client premises, as well as back-end resources at the provider network and one or more recognition-based action initiators in some embodiments. In some embodiments, a client may provide information about devices at the tiers external to the provider network, and the analytics service may choose/assign one or more back-end resources for the DORA. The recognition-based action initiators may be executed at, and/or linked via network connections to, any of the tiers of the DORA and may be configured to initiate tasks (such as opening an entrance door of a building, or notifying an individual that additional identification information is needed before the individual is permitted to enter a building) based on recognition or non-recognition of entities in various embodiments. In other embodiments, an intermediary tier may not be included, or several intermediary tiers may be included. In some embodiments, the recognition-based action initiators may be considered external to the DORA; that is, the DORA may be configured to provide results of entity recognition to one or more destination network endpoints external to the DORA, and performing the recognition-based actions based on such results may not be the DORA's responsibility.

An authoritative or baseline sensor output set (e.g., authoritative/baseline images with respect to which entities have to be recognized within newly-captured images) may be obtained at the analytics service via programmatic interfaces in some embodiments (element 904). In addition, various types of operational requirements or targets for the DORA (e.g., how quickly results of object recognition searches have to be provided), confidence levels/accuracy thresholds (e.g., how similar do contents of a newly captured image have to be to a baseline/authoritative image to decide that an entity in the new image has been recognized), DORA availability, etc., may be obtained from a client via the programmatic interfaces in various embodiments.

An algorithm for constructing, partitioning and distributing a spatial index may be selected at the analytics service in various embodiments (element 907). The selection may be based on a variety of factors such as the operational targets, the computing and memory/storage capabilities of the resources at the tiers external to the provider network, the size of the baseline image set or baseline set of other types of sensor output, and/or algorithm preferences indicated by client in the depicted embodiment.

Resources at the analytics service (e.g., back-end task coordinators similar to BTCs 120 shown in FIG. 1) may cause software programs or components to be used for object recognition (e.g., agents of the analytics service which can maintain and search caches of spatial index contents) to be installed at the devices of the tiers external to the provider network. The analytics service resources may verify that the installations succeeded and that at least some of the components at each layer can communicate via one or more networks to devices at other layers (element 910) in at least some embodiments. In various embodiments, the client on whose behalf the DORA is set up may be provided an indication via a programmatic interface that connectivity between tiers has been verified.

A spatial index (SI) and corresponding spatial index partition map (SIPM) for the baseline image set may be constructed or generated (element 913), e.g., using the selected algorithm at the analytics service. Any of a variety of algorithms and data structures which support spatial searches, such as the kinds of data structures shown in FIG. 7, may be used in different embodiments. Optionally the SIPM and/or at least some partitions of the spatial index may be proactively distributed among resources at the external tiers in accordance with a placement and replication policy selected for the DORA (e.g., with the policy being selected based on programmatic input from the client) in some embodiments. In other embodiments, at least some of the partitions and/or the SIPM may be provided to resources at the other tiers from the back-end provider network tier on demand, e.g., when a request is received from the resource. The software components/programs at the external tiers may be activated to start object recognition in various embodiments.

Figure 10:
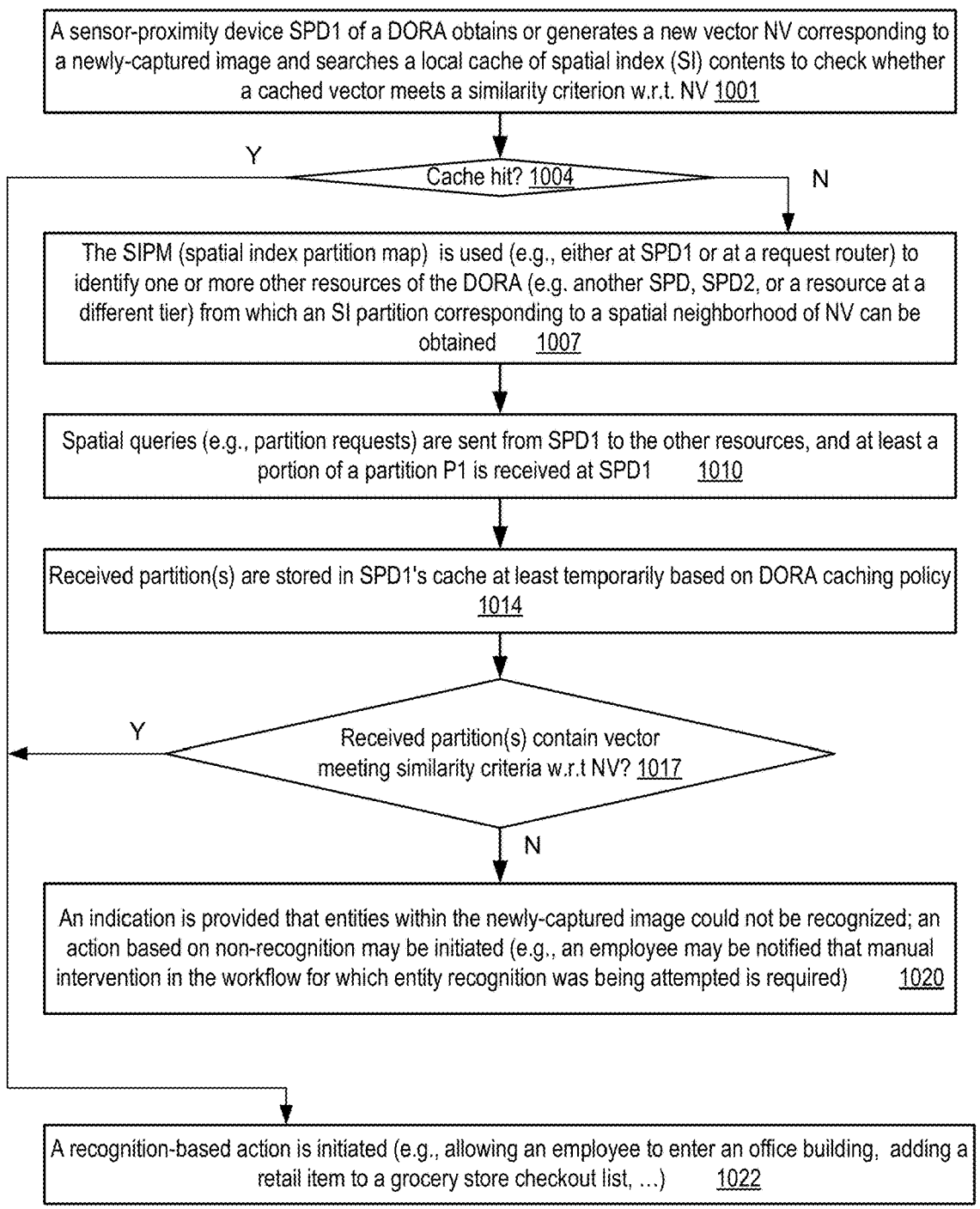
FIG. 10 is a flow diagram illustrating aspects of operations that may be performed in response to a capture of an image at a distributed object recognition application, according to at least some embodiments.

FIG. 10 is a flow diagram illustrating aspects of operations that may be performed in response to a capture of an image at a distributed object recognition application, according to at least some embodiments. As indicated earlier, images represent one example of the kind of sensor-captured data with respect to which distributed object recognition may be performed using spatial index partitioning in different embodiments. In other embodiments, distributed object recognition may be performed using vectors or encodings generated from videos, audio recordings, thermal scans, text documents, and the like. As shown in element 1001, a sensor-proximity device SPD1 of a DORA may obtain or generate a new encoding or embedding vector NV corresponding to a newly-captured image (e.g., an image acquired by one or more camera near SPD1) in the depicted embodiment. A local cache of contents of a spatial index generated for the DORA may be searched (e.g., by an analytics service agent similar to ASAs 133 of FIG. 1) to determine whether a cached vector meets a similarity criterion with respect to NV. The similarity criterion itself may be a tunable parameter of the DORA (expressed, for example, in terms if Euclidean distances between vectors) which may be adjusted over time based on feedback received from the client on whose behalf the DORA is set up, and/or based on feedback from end users of the DORA. If such a criterion-satisfying vector is identified in the local cache at SPD1, i.e., if a cache hit occurs as detected in operations corresponding to element 1004, a recognition-based action may be quickly initiated in various embodiments as shown in element 1022.

If the local cache of SPD1 does not contain a sufficiently-similar vector to NV, and a cache miss occurs, as also detected in operations corresponding to element 1004, the spatial index partition map of the DORA may be consulted in the depicted embodiment (element 1007). The SIPM may be used, e.g., either at SPD1 itself or at a request router other than SPD1, similar in functionality to request router 605 discussed in the context of FIG. 6), to identify one or more other resources of the DORA at which one or more relevant partitions representing a spatial neighborhood of NV in vector space are stored in the depicted embodiment. The other resources, which may be referred to as query targets, may be at the same tier (e.g., a different SPD, SPD2) as SPD1, or at a different tier (e.g., an intermediary-tier caching server similar to ICSs 142 of FIG. 1, or a BTC at the provider network).

In various embodiments, one or more spatial queries (which may also be referred to as partition requests) indicating NV may be transmitted to one or more of the query targets (element 1010), e.g., from SPD1 or from the request router. At least a portion of a spatial index partition P1 may be received at SPD1 from one or more of the query targets in the depicted embodiment. In some embodiments in which it is possible to obtain P1 from multiple query targets, queries may be directed to query targets based on proximity—e.g., first, one or more nearby SPDs (if any are expected to have a relevant partition) may be requested to send the partition, then a more distant SPD may be queried, and if P1 cannot be obtained from the SPD tier, a query may be directed to an intermediate tier server or to the provider network tier.

The received partition P1 (or portion of a partition) may be stored at SPD1's local cache at least temporarily based on DORA caching policies in some embodiments (element 1014). A search of the newly-received partition may be conducted at SPD1 in the depicted embodiment. If a vector satisfying the similarity criterion with respect to NV is found (as detected on operations corresponding to element 1017), a recognition-based action may initiated (element 1022).

If the received partition contents do not include a vector which meets the similarity criterion, in some embodiments a programmatic indication may be provided that the newly-captured image did not contain a recognized entity (element 1020). In at least one embodiment, an action based on non-recognition may be initiated. For example, an employee of an organization for which the DORA is established may be notified that manual intervention is required in the workflow for which entity recognition was being attempted, or an individual may be notified that additional identification information has to be verified before the individual is to be permitted to enter a building, and so on.

It is noted that in various embodiments, some of the operations shown in FIG. 9 and/or FIG. 10 may be implemented in a different order than that shown in the figure, or may be performed in parallel rather than sequentially. Additionally, some of the operations shown in FIG. 9 and/or FIG. 10 may not be required in one or more implementations.

Example Provider Network Environment

Figure 11:
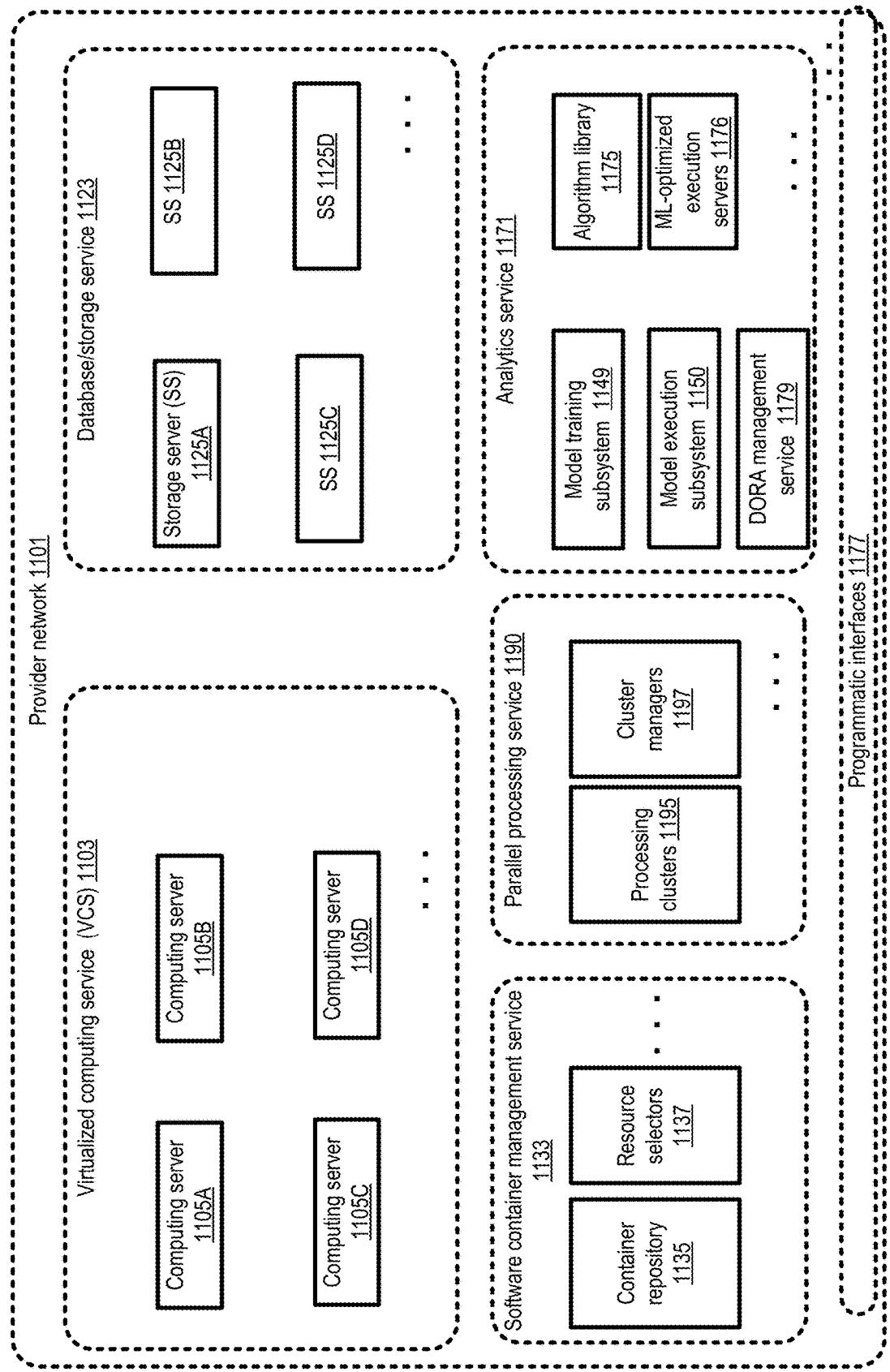
FIG. 11 illustrates an example provider network environment in which an analytics service which coordinates distributed object recognition applications may be implemented, according to at least some embodiments.

FIG. 11 illustrates an example provider network environment in which an analytics service which coordinates distributed object recognition applications may be implemented, according to at least some embodiments. In the depicted embodiment, provider network 1101 may comprise resources used to implement a plurality of services, including for example a virtualized computing service (VCS) 1103, a database/storage service 1123, a software container management service 1133, a parallel processing service 1190 as well as an analytics service 1171 within which a DORA management service 1179 may be implemented as a subcomponent. The DORA management service 1179 may include, for example, an embedding vector repository, spatial index generators, a DORA metadata repository and a set of back-end task coordinators (BTCs) similar in functionality to the similarly-named elements shown in FIG. 1.

The analytics service 1171, which may also be referred to as a machine learning service or an artificial intelligence service, may also comprise algorithm library 1175, model training subsystem 1149 at which various types of models may be trained and re-trained using algorithms from library 1175, model execution subsystem 1150 at which the models are executed, as well as a set of machine learning-optimized execution servers 1176 (e.g., servers comprising chipsets developed specifically for ML tasks) in the depicted embodiment. The parallel processing service 1190 may comprise one or more processing clusters 1195 at which parallelizable tasks, such as the generation of spatial index partitions, may be conducted with the help of cluster managers 1197 in the depicted embodiment. Software container management service 1133 may for example comprise a container repository 1135 for software containers used to implement some of the tasks of a DORA (such as ASA functions) or various machine learning-related tasks in the depicted embodiment. Resource selectors 1137 of the container management service may be responsible for selecting specific computing resources at which a given container should be executed.

Components of a given service may utilize components of other services in the depicted embodiment—e.g., for some machine learning service tasks, virtual machines implemented at computing servers such as 1105A-1105D of the virtualized computing service 1103 may be used, example input data, metrics and/or output produced at the machine learning service may be stored at storage servers 1125 (e.g., 1125A-1125D) of storage service 1123, and so on. Individual ones of the services shown in FIG. 11 may implement a respective set of programmatic interfaces 1177 which can be used by external and/or internal clients (where the internal clients may comprise components of other services) in the depicted embodiment.

Illustrative Computer System

Figure 12:
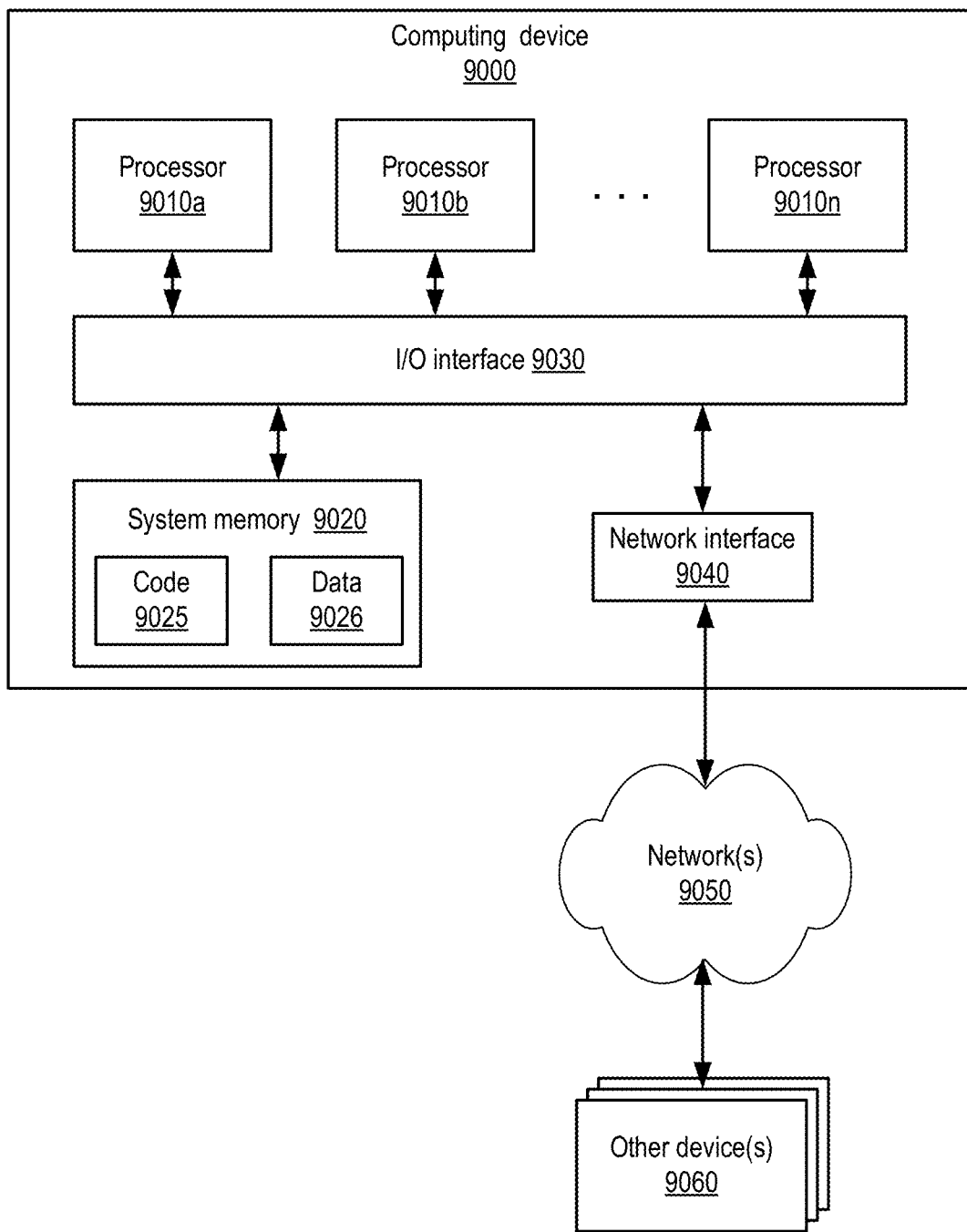
FIG. 12 is a block diagram illustrating an example computing device that may be used in at least some embodiments.

In at least some embodiments, a server that implements the types of techniques described herein (e.g., various functions of an analytics service, analytics service agents run at tiers of a DORA external to a provider network, and/or functions of network-accessible services similar to the services depicted in FIG. 11), may include a general-purpose computer system that includes or is configured to access one or more computer-accessible media. FIG. 12 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, ARM, or MIPS ISAs, or any other suitable ISA. In multiprocessor systems, each of processors 9010 may commonly, but not necessarily, implement the same ISA. In some implementations, graphics processing units (GPUs) and or field-programmable gate arrays (FPGAs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 11, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may represent one embodiment of a computer-accessible medium configured to store at least a subset of program instructions and data used for implementing the methods and apparatus discussed in the context of FIG. 1 through FIG. 11. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. In some embodiments, a plurality of non-transitory computer-readable storage media may collectively store program instructions that when executed on or across one or more processors implement at least a subset of the methods and techniques described above. A computer-accessible medium may further include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 12 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A computer-implemented method, comprising:
    obtaining, via one or more programmatic interfaces at a service of a cloud computing environment, an indication of respective computing capabilities of a plurality of sensor-proximity devices of an entity recognition application;
    distributing, by the service to a first sensor-proximity device of the plurality of sensor-proximity devices, one or more data structures for determining whether a first encoding of a first entity detected at a first sensor associated with the first sensor-proximity device satisfies a similarity criterion with respect to one or more encodings of a set of encodings of other entities, wherein the one or more data structures are selected at the service for distribution to the first sensor-proximity device based at least in part on a computing capability of the first sensor-proximity device; and
    causing, by the first sensor-proximity device, a particular action with respect to the first entity to be initiated in response to determining, using the one or more data structures, that the first encoding satisfies a similarity criterion with respect to a second encoding of the set of encodings.

2. The computer-implemented method as recited in claim 1, wherein the one or more data structures include at least a portion of a spatial index.

3. The computer-implemented method as recited in claim 1, further comprising:

creating, at the service, using one or more neural networks, respective encodings of the set of encodings; and generating, at the service, the one or more data structures from the respective encodings.

4. The computer-implemented method as recited in claim 1, further comprising:

generating, at the service, a map indicating that the one or more data structures have been distributed to the first sensor-proximity device;

determining, by a second sensor-proximity device of the plurality of sensor-proximity devices, using the map, that the first sensor-proximity device has the one or more data structures;

obtaining, at the second sensor-proximity device from the first sensor-proximity device, based at least in part on said determining, at least a portion of the one or more data structures; and utilizing, at the second sensor-proximity device, the portion of the one or more data structures to determine that an action is to be initiated with respect to another entity.

5. The computer-implemented method as recited in claim 1, further comprising:

receiving, at the service via the one or more programmatic interfaces, a policy for distributing the one or more data structures; and distributing, by the service in accordance with the policy, the one or more data structures to one or more sensor-proximity devices including the first sensor-proximity device.

6. The computer-implemented method as recited in claim 1, further comprising:

receiving, at the service via the one or more programmatic interfaces, a performance objective for entity recognition; and distributing, by the service in accordance with the performance objective, the one or more data structures to one or more sensor-proximity devices including the first sensor-proximity device.

7. The computer-implemented method as recited in claim 1, wherein the first sensor comprises one or more of: (a) a camera, (b) a document scanner, (c) a thermal scanner, (d) a weight sensor, (e) a motion sensor, (f) a microphone, or (g) a LIDAR (light detection and ranging) device.

8. A system, comprising:
one or more computing devices;
wherein the one or more computing devices include instructions that upon execution on or across the one or more computing devices:

obtain, via one or more programmatic interfaces at a service of a cloud computing environment, an indication of respective computing capabilities of a plurality of sensor-proximity devices of an entity recognition application;

distribute, by the service to a first sensor-proximity device of the plurality of sensor-proximity devices, one or more data structures for determining whether a first encoding of a first entity detected at a first sensor associated with the first sensor-proximity device satisfies a similarity criterion with respect to one or more encodings of a set of encodings of other entities, wherein the one or more data structures are selected at the service for distribution to the first sensor-proximity device based at least in part on a computing capability of the first sensor-proximity device; and cause, by the first sensor-proximity device, a particular action with respect to the first entity to be initiated in response to determining, using the one or more data structures, that the first encoding satisfies a similarity criterion with respect to a second encoding of the set of encodings.

9. The system as recited in claim 8, wherein the one or more data structures include at least a portion of a spatial index.

10. The system as recited in claim 8, wherein the one or more computing devices include further instructions that upon execution on or across the one or more computing devices:

create, at the service, using one or more neural networks, respective encodings of the set of encodings; and generate, at the service, the one or more data structures from the respective encodings.

11. The system as recited in claim 8, wherein the one or more computing devices include further instructions that upon execution on or across the one or more computing devices:

generate, at the service, a map indicating that the one or more data structures have been distributed to the first sensor-proximity device;

determine, by a second sensor-proximity device of the plurality of sensor-proximity devices, using the map, that the first sensor-proximity device has the one or more data structures;

obtain, at the second sensor-proximity device from the first sensor-proximity device, based at least in part on determination that the first sensor-proximity device has the one or more data structures, at least a portion of the one or more data structures; and utilize, at the second sensor-proximity device, the portion of the one or more data structures to determine that an action is to be initiated with respect to another entity.

12. The system as recited in claim 8, wherein the one or more computing devices include further instructions that upon execution on or across the one or more computing devices:

receive, at the service via the one or more programmatic interfaces, a policy for distributing the one or more data structures; and distribute, by the service in accordance with the policy, the one or more data structures to one or more sensor-proximity devices including the first sensor-proximity device.

13. The system as recited in claim 8, wherein the one or more computing devices include further instructions that upon execution on or across the one or more computing devices:

receive, at the service via the one or more programmatic interfaces, a performance objective for entity recognition; and distribute, by the service in accordance with the performance objective, the one or more data structures to one or more sensor-proximity devices including the first sensor-proximity device.

14. The system as recited in claim 8, wherein the first sensor comprises one or more of: (a) a camera, (b) a document scanner, (c) a thermal scanner, (d) a weight sensor, (e) a motion sensor, (f) a microphone, or (g) a LIDAR (light detection and ranging) device.

15. One or more non-transitory computer-accessible storage media storing program instructions that when executed on or across one or more processors:

obtain, via one or more programmatic interfaces at a service of a cloud computing environment, an indication of respective computing capabilities of a plurality of sensor-proximity devices of an entity recognition application;

distribute, by the service to a first sensor-proximity device of the plurality of sensor-proximity devices, one or more data structures for determining whether a first encoding of a first entity detected at a first sensor associated with the first sensor-proximity device satisfies a similarity criterion with respect to one or more encodings of a set of encodings of other entities, wherein the one or more data structures are selected at the service for distribution to the first sensor-proximity device based at least in part on a computing capability of the first sensor-proximity device; and cause, by the first sensor-proximity device, a particular action with respect to the first entity to be initiated in response to determining, using the one or more data structures, that the first encoding satisfies a similarity criterion with respect to a second encoding of the set of encodings.

16. The one or more non-transitory computer-accessible storage media as recited in claim 15, wherein the one or more data structures include at least a portion of a spatial index.

17. The one or more non-transitory computer-accessible storage media as recited in claim 15, storing further program instructions that when executed on or across the one or more processors:

create, at the service, using one or more neural networks, respective encodings of the set of encodings; and generate, at the service, the one or more data structures from the respective encodings.

18. The one or more non-transitory computer-accessible storage media as recited in claim 15, storing further program instructions that when executed on or across the one or more processors:

generate, at the service, a map indicating that the one or more data structures have been distributed to the first sensor-proximity device;

determine, by a second sensor-proximity device of the plurality of sensor-proximity devices, using the map, that the first sensor-proximity device has the one or more data structures;

obtain, at the second sensor-proximity device from the first sensor-proximity device, based at least in part on determination that the first sensor-proximity device has the one or more data structures, at least a portion of the one or more data structures; and utilize, at the second sensor-proximity device, the portion of the one or more data structures to determine that an action is to be initiated with respect to another entity.

19. The one or more non-transitory computer-accessible storage media as recited in claim 15, storing further program instructions that when executed on or across the one or more processors:

receive, at the service via the one or more programmatic interfaces, a policy for distributing the one or more data structures; and distribute, by the service in accordance with the policy, the one or more data structures to one or more sensor-proximity devices including the first sensor-proximity device.

20. The one or more non-transitory computer-accessible storage media as recited in claim 15, storing further program instructions that when executed on or across the one or more processors:

receive, at the service via the one or more programmatic interfaces, a performance objective for entity recognition; and distribute, by the service in accordance with the performance objective, the one or more data structures to one or more sensor-proximity devices including the first sensor-proximity device.

\* \* \* \* \*